US007013294B1

(12) United States Patent
Sekigawa et al.

(10) Patent No.: US 7,013,294 B1
(45) Date of Patent: Mar. 14, 2006

(54) LICENSE MANAGEMENT SYSTEM

(75) Inventors: Kazunari Sekigawa, Nagano (JP); Tomomi Sato, Nagano (JP); Supriya K. Patel, Bangalore (IN); Sanjay D. Sankolli, Bangalore (IN)

(73) Assignee: Shinko Electric Industries Co., Ltd., Nagano (JP)

( * ) Notice: Subject to any disclaimer, the term of this patent is extended or adjusted under 35 U.S.C. 154(b) by 0 days.

(21) Appl. No.: 09/202,189

(22) PCT Filed: Jul. 15, 1997

(86) PCT No.: PCT/JP97/02460

§ 371 (c)(1), (2), (4) Date: Jun. 4, 1999

(87) PCT Pub. No.: WO99/04354

PCT Pub. Date: Jan. 28, 1999

(51) Int. Cl.
*G06F 17/60* (2006.01)

(52) U.S. Cl. ........................................... 705/59; 705/57

(58) Field of Classification Search ..................... 705/8, 705/54, 53, 51, 59, 1, 57
See application file for complete search history.

(56) References Cited

U.S. PATENT DOCUMENTS

| | | | | |
|---|---|---|---|---|
| 3,614,745 A | * 10/1971 | Podvin et al. | ........... | 340/172.5 |
| 4,924,378 A | * 5/1990 | Hershey et al. | ............. | 364/200 |
| 4,937,863 A | * 6/1990 | Robert et al. | .................. | 380/4 |

(Continued)

FOREIGN PATENT DOCUMENTS

| | | |
|---|---|---|
| EP | 0332304 * | 2/1989 |
| EP | 0613073 A1 * | 8/1993 |
| KR | 2004-43673957 | 10/2004 |
| WO | WO 92/20021 A1 * | 11/1992 |
| WO | 93 01550 | 1/1993 |
| WO | WO 93/11480 A1 * | 6/1993 |
| WO | WO 95/34857 A1 * | 12/1995 |

OTHER PUBLICATIONS

Paul Krill, "Wifinet Utility Reduces NetWare License Requirements," Infoworld, Mar. 13, 1995, p. 47.*
Christopher Hall and Carey Tews, "FileWave 2.0 Shines with simplicity and easy administration", Infoworld, Oct. 24, 1994, Infoworld, p. 139.*
Anonymous, "Cost Confusion Over Licensing Revamp", Computer Finance, No. 31, May 2, 1994.*
West, Lawrence A Jr., "Researching The Costs of Information Systems", Journal of Management Information Systems: JMIS, vol. 11, No. 2, pp. 75–107, 1994.*
Masson, Robert, "Parellel and Almost Personal", Machine Design, vol. 67, No. 8, Apr. 20, 1995.*

*Primary Examiner*—John W. Hayes
(74) *Attorney, Agent, or Firm*—Staas & Halsey LLP

(57) ABSTRACT

A license management system for software which drives a single computer or a plurality of computers includes: an application program for requesting a decision of the number of license which it needs to drive itself and for receiving issuance of the license; a number of license decision unit for determining the necessary number of licenses in accordance with the request from the application program; and a license management unit for issuing the number of licenses which was determined by the number of license decision unit. Further, the number of license decision unit has means for determining the number of licenses based on the following multi-nominal function, LK=f (x1, x2, . . . , xn), where, LK is the number of licenses, and x1 to xn are parameters which are needed to determine the number of licenses. According to the present invention, it is possible to provide a license management system enabling issuance of a license in which the sales strategy of a software maker was considered.

68 Claims, 37 Drawing Sheets

U.S. PATENT DOCUMENTS

| | | | | | |
|---|---|---|---|---|---|
| 5,204,897 | A | * | 4/1993 | Wyman | 380/4 |
| 5,230,051 | A | * | 7/1993 | Quan | 395/700 |
| 5,260,999 | A | | 11/1993 | Wyman | |
| 5,375,206 | A | | 12/1994 | Hunter et al. | |
| 5,390,297 | A | * | 2/1995 | Barber et al. | 395/200 |
| 5,438,508 | A | * | 8/1995 | Wyman | 364/401 |
| 5,579,222 | A | * | 11/1996 | Bains et al. | 395/712 |
| 5,619,656 | A | * | 4/1997 | Graf | 395/200.11 |
| 5,671,412 | A | * | 9/1997 | Christiano | 395/615 |
| 5,752,041 | A | * | 5/1998 | Fosdick | 395/712 |
| 5,754,763 | A | * | 5/1998 | Bereiter | 395/187.01 |
| 5,758,068 | A | * | 5/1998 | Brandt et al. | 395/186 |
| 5,758,069 | A | * | 5/1998 | Olsen | 395/187.01 |
| 5,825,883 | A | * | 10/1998 | Archibald et al. | 380/25 |
| 5,864,620 | A | * | 1/1999 | Pettitt | 380/4 |
| 5,905,860 | A | * | 5/1999 | Olsen et al. | 395/187.01 |
| 5,930,357 | A | * | 7/1999 | Fukui | 380/4 |
| 5,940,504 | A | * | 8/1999 | Griswold | 380/4 |
| 5,991,876 | A | * | 11/1999 | Johnson et al. | 713/200 |
| 6,021,438 | A | * | 2/2000 | Duvvoori et al. | 709/224 |
| 6,023,766 | A | * | 2/2000 | Yamamura | 705/59 |

* cited by examiner

Fig. 40(A)

```
/*****************************************************/
/* Application:  Product #MP439                      */
/*---------------------------------------------------*/
/* Source : license.c                                */
/* Object : license.o                                */
/*---------------------------------------------------*/
/* (C) SHINKO ELECTRIC INDUSTRIES CO., LTD.          */
/*      Production Engineering Division,             */
/*      System Devices Development Department.       */
/*                                                   */
/*****************************************************/

#include <stdio.h>
#include <string.h>
#include <unistd.h>
#include <sys/systeminfo.h>



#define     NL_DEAULT          1
#define     NL_MEM_FACTOR      1.8        /* determined experimentally   */

```

Fig.40(B)

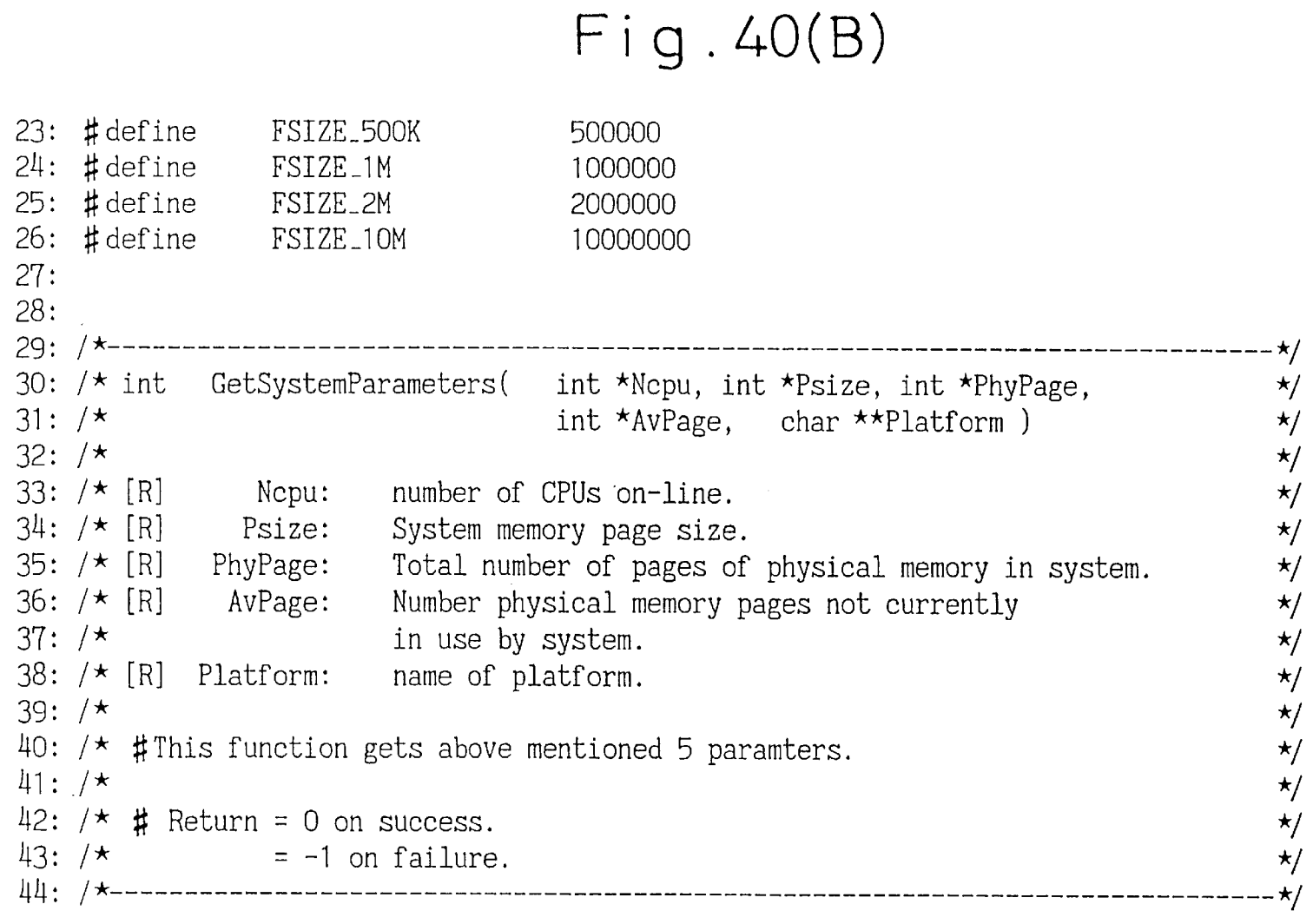

```
#define     FSIZE_500K          500000
#define     FSIZE_1M            1000000
#define     FSIZE_2M            2000000
#define     FSIZE_10M           10000000


/*--------------------------------------------------------------------------*/
/* int   GetSystemParameters(   int *Ncpu, int *Psize, int *PhyPage,         */
/*                              int *AvPage,   char **Platform )             */
/*                                                                           */
/* [R]      Ncpu:    number of CPUs on-line.                                 */
/* [R]     Psize:    System memory page size.                                */
/* [R]   PhyPage:    Total number of pages of physical memory in system.     */
/* [R]    AvPage:    Number physical memory pages not currently              */
/*                   in use by system.                                       */
/* [R]  Platform:    name of platform.                                       */
/*                                                                           */
/* #This function gets above mentioned 5 paramters.                          */
/*                                                                           */
/* # Return = 0 on success.                                                  */
/*          = -1 on failure.                                                 */
/*--------------------------------------------------------------------------*/
```

Fig. 40(C)

```
int GetSystemParameters(   int *Ncpu, int *Psize, int *PhyPage,
                           int *AvPage,   char **Platform )
{

        long    p1, p2, p3, p4;
        static  char pname[64];


         /*--------------------------*/
         /*  [1] get system limits   */
         /*--------------------------*/
         p1  = sysconf( _SC_NPROCESSORS_ONLN );
         p2  = sysconf( _SC_PAGESIZE );
         p3  = sysconf( _SC_PHYS_PAGES );
         p4  = sysconf( _SC_AVPHYS_PAGES );

         if ( p1 == -1L || p2 == -1L || p3 == -1L || p4 == -1L ) {
              *Ncpu      = 0;
              *Psize     = 0;
              *PhyPage   = 0;
              *AvPage    = 0;
              *Platform  = NULL;
```

Fig.40(D)

```
            return(-1);
        }


        /*--------------------------*/
        /*  [2] get platform name   */
        /*--------------------------*/
        if ( sysinfo( SI_PLATFORM, pname, sizeof(pname) ) <= 0 ) {
            *Ncpu       = 0;
            *Psize      = 0;
            *PhyPage    = 0;
            *AvPage     = 0;
            *Platform   = NULL;
            return(-1);
        }
        else {
            *Ncpu       = (int)p1;
            *Psize      = (int)p2;
            *PhyPage    = (int)p3;
            *AvPage     = (int)p4;
            *Platform   = pname;
            return(0);
```

Fig.40(E)

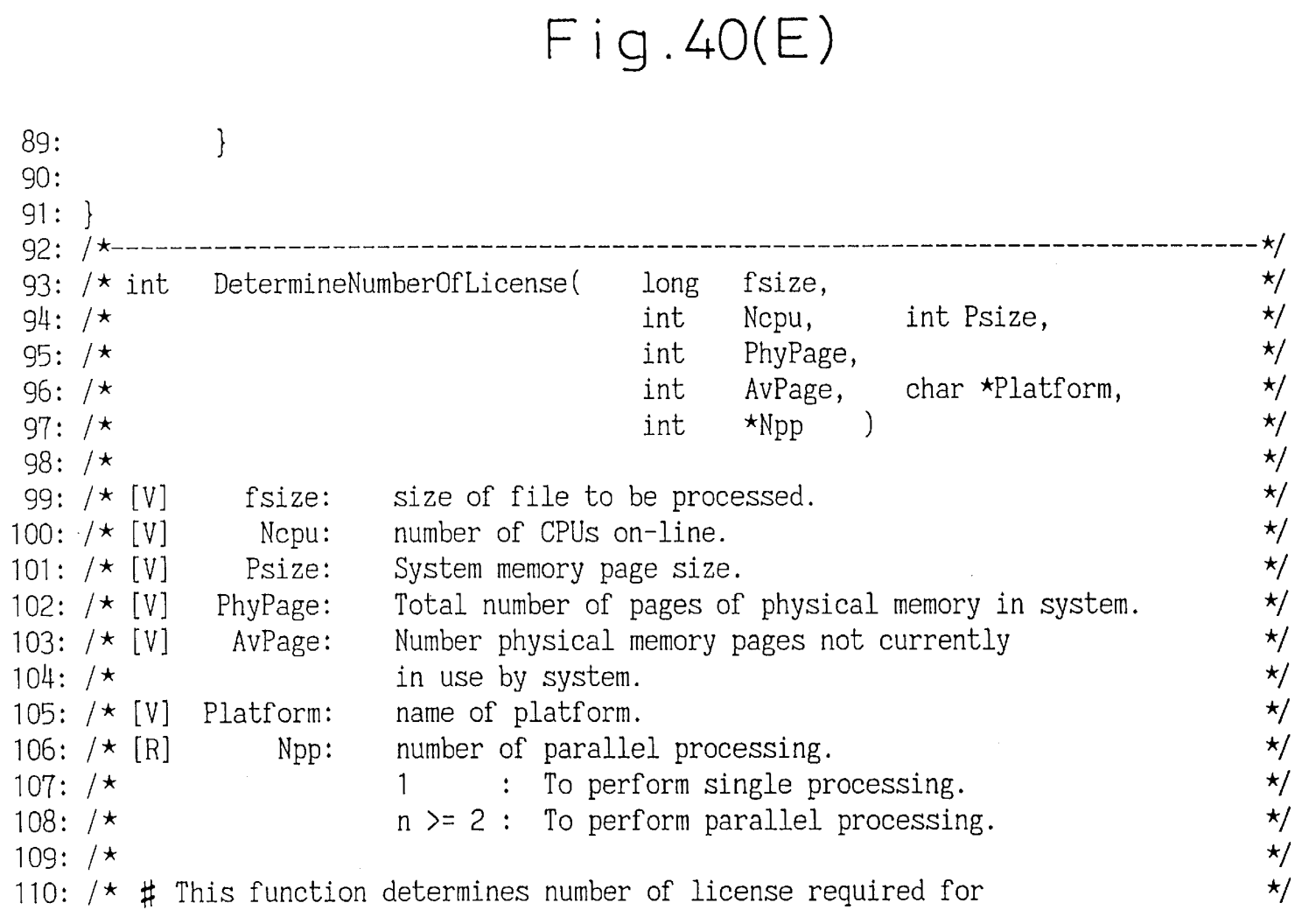

```
            }

}
/*------------------------------------------------------------------------------*/
/* int   DetermineNumberOfLicense(    long   fsize,                             */
/*                                    int    Ncpu,       int Psize,             */
/*                                    int    PhyPage,                           */
/*                                    int    AvPage,     char *Platform,        */
/*                                    int    *Npp    )                          */
/*                                                                              */
/* [V]      fsize:    size of file to be processed.                             */
/* [V]       Ncpu:    number of CPUs on-line.                                   */
/* [V]      Psize:    System memory page size.                                  */
/* [V]    PhyPage:    Total number of pages of physical memory in system.       */
/* [V]     AvPage:    Number physical memory pages not currently                */
/*                    in use by system.                                         */
/* [V]   Platform:    name of platform.                                         */
/* [R]        Npp:    number of parallel processing.                            */
/*                    1      :  To perform single processing.                   */
/*                    n >= 2 :  To perform parallel processing.                 */
/*                                                                              */
/* # This function determines number of license required for                    */
```

Fig. 40(F)

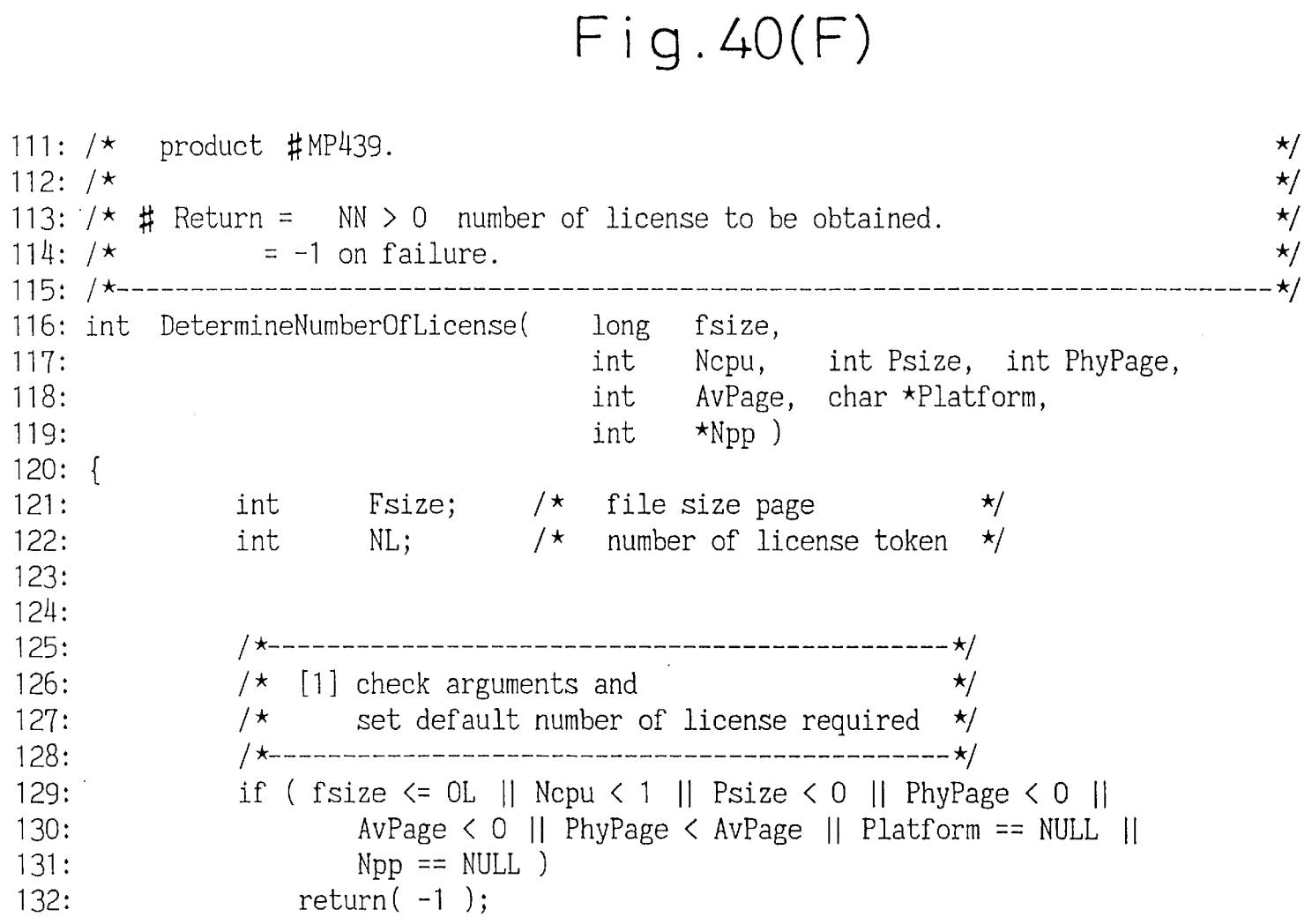

```
/*   product #MP439.                                                          */
/*                                                                            */
/* # Return =   NN > 0  number of license to be obtained.                     */
/*          = -1 on failure.                                                  */
/*--------------------------------------------------------------------------*/
int  DetermineNumberOfLicense(    long   fsize,
                                  int    Ncpu,    int Psize,  int PhyPage,
                                  int    AvPage,  char *Platform,
                                  int    *Npp )
{
          int      Fsize;     /*  file size page           */
          int      NL;        /*  number of license token  */


          /*-----------------------------------------*/
          /*  [1] check arguments and                */
          /*      set default number of license required  */
          /*-----------------------------------------*/
          if ( fsize <= 0L  || Ncpu < 1  || Psize < 0  || PhyPage < 0  ||
                 AvPage < 0  || PhyPage < AvPage  || Platform == NULL  ||
                 Npp == NULL )
              return( -1 );
```

Fig.40(G)

```
else
    NL = NL DEFAULT;
/*-----------------------------------------------------------------*/
/*  [2] check if the machine is SPARCserver having multi-CPUs     */
/*-----------------------------------------------------------------*/
if ( Ncpu == 1 || strstr( Platform, "SPARCserver" ) == NULL)  {
    *Npp = 1;
    return( NL );
}
/***    if SPARCserver, double default value of NL  ***/
else
    NL = NL_DEFAULT + NL_DEFAULT;
/*--------------------------------*/
/*   [3] get file size in page    */
/*--------------------------------*/
Fsize = fsize % Psize;
if ( Fsize == 0 )
```

Fig.40(H)

```
        Fsize == fsize / Psize;
    else
        Fsize == fsize / Psize + 1;


    /*----------------------------------------------------*/
    /*   [4] check if enough unused memory pages exist    */
    /*----------------------------------------------------*/
    if ( Fsize * NL_MEM_FACTOR > AvPage ) {
        *Npp = 1;
        return( NL );
    }
    if ( fsize < FSIZE_1M ) {
        *Npp = 1;
        NL  *= 1;       /* determine number of license          */
        return( NL );
    }
    else if ( FSIZE_1M <= fsize && fsize <= FSIZE_2M ) {
        *Npp = 2;
        NL  *= 2;       /* determine number of license          */
        return( NL );
    }
```

Fig. 40(I)

```
            else {
                *Npp = Ncpu - 1;     /* set number of parallel processes      */
                NL  *= (Ncpu - 1);   /* determine number of license           */
                return( NL );
            }

}
/*-----------------------------------------------------------------------------*/

```

Fig. 41(A)

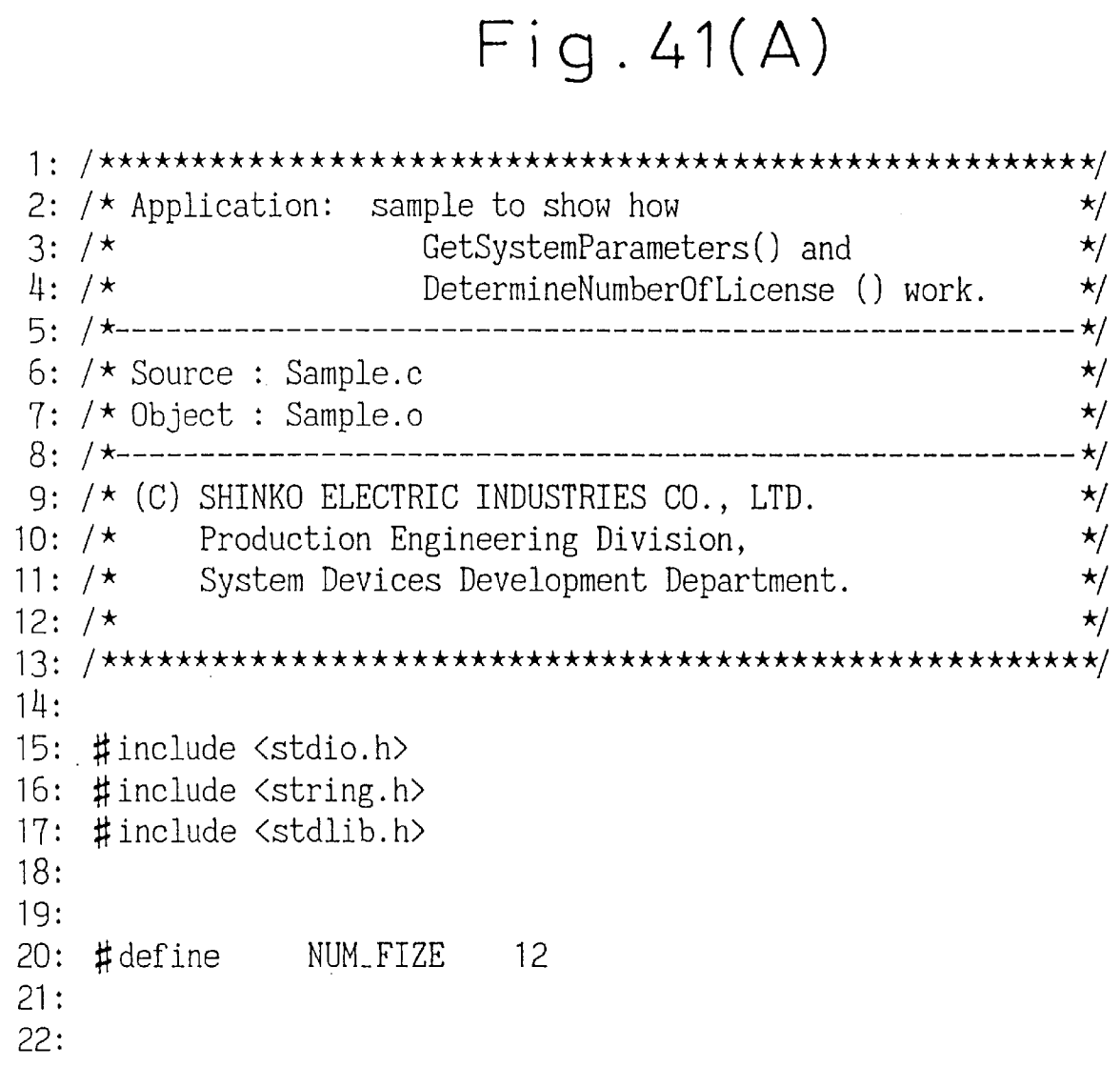

```
/**************************************************/
/* Application:  sample to show how               */
/*                  GetSystemParameters() and     */
/*                  DetermineNumberOfLicense () work.  */
/*------------------------------------------------*/
/* Source : Sample.c                              */
/* Object : Sample.o                              */
/*------------------------------------------------*/
/* (C) SHINKO ELECTRIC INDUSTRIES CO., LTD.       */
/*     Production Engineering Division,           */
/*     System Devices Development Department.     */
/*                                                */
/**************************************************/

#include <stdio.h>
#include <string.h>
#include <stdlib.h>


#define     NUM_FIZE    12


```

Fig.41(B)

```
extern int GetSystemParameters( int *, int *, int *, int *, char ** );
extern int DetermineNumberOfLicense( long, int, int, int, int, char *, int * )
;


int main( int argc, char *argv [] )
{

    static long fsize[NUM_FIZE] =   {       10000,      /*    10k */
                                            20000,      /*    20k */
                                            50000,      /*    50k */
                                           100000,      /*   100k */
                                           200000,      /*   200k */
                                           500000,      /*   500k */
                                          1000000,      /*     1M */
                                          2000000,      /*     2M */
                                          5000000,      /*     5M */
                                         10000000,      /*    10M */
                                         20000000,      /*    20M */
                                         50000000       /*    50M */    } ;

```

Fig.41(C)

```
        int     ret;
        int     cnt;

        int     Ncpu;
        int     Psize;
        int     PhyPage;
        int     AvPage;
        char    *Platform;
        int     Npp;


        /*---------------------------*/
        /*   [1] reset variables     */
        /*---------------------------*/
        Ncpu        = 0;
        Psize       = 0;
        PhyPage     = 0;
        AvPage      = 0;
        Platform    = NULL;
        Npp         = 0;


```

Fig.41(D)

```
        /*----------------------------*/
        /*  [2] get system parameters  */
        /*----------------------------*/
        ret = GetSystemParameters( &Ncpu, &Psize, &PhyPage, &AvPage, &Platform
);
        if (ret != 0) {
            (void)fprintf( stderr, "! Error : GetSystemParameters() !\n");
            exit(1);
        }
        else {
(void)printf( "-----------------------------------------------------------
----\n" );
            (void)printf( "(1) Platform      =% s\n", Platform );
            (void)printf( "(2) Number of CPU =% d\n", Ncpu );
            (void)printf( "(3) Page size     =% d\n", Psize );
            (void)printf( "(4) PhyPage       =% d\n", PhyPage );
            (void)printf( "(5) AvPage        =% d\n", AvPage );
(void)printf( "-----------------------------------------------------------
----\n" );
        }
```

Fig.41(E)

```
        /*--------------------------------------------------------*/
        /*  [3] determine number of license for each file size    */
        /*--------------------------------------------------------*/
        for (cnt = 0; cnt < NUM_FIZE; cnt++) {

            ret = DetermineNumberOfLicense( fsize[cnt], Ncpu, Psize, PhyPage,
AvPage,
                                              Platform, &Npp);

            if (ret == -1) {
                (void)fprintf( stderr, "! Error : DetermineNumberOfLicense() !
\n" );
                exit(1);
            }
            else {
                (void)printf(
                "File size = % 81d  Number of Process = % d  Number of license
= % d\n",
                                                           fsize[cnt], Np
p, ret );
```

Fig.41(F)

```
                }

        } /* for-cnt   */


        (void)printf("\n");
        return(0);

}
```

Fig.42(A)

```
kai13 {sato} (8)% sample
------------------------------------------------------------------
(1) Platform      = SUNW,Sun_4_65
(2) Number of CPU = 1
(3) Page size     = 4096
(4) PhyPage       = 10240
(5) AvPage        = 129
------------------------------------------------------------------
File size =    10000   Number of Process = 1  Number of License = 1
File size =    20000   Number of Process = 1  Number of License = 1
File size =    50000   Number of Process = 1  Number of License = 1
File size =   100000   Number of Process = 1  Number of License = 1
File size =   200000   Number of Process = 1  Number of License = 1
File size =   500000   Number of Process = 1  Number of License = 1
File size =  1000000   Number of Process = 1  Number of License = 1
File size =  2000000   Number of Process = 1  Number of License = 1
File size =  5000000   Number of Process = 1  Number of License = 1
File size = 10000000   Number of Process = 1  Number of License = 1
File size = 20000000   Number of Process = 1  Number of License = 1
File size = 50000000   Number of Process = 1  Number of License = 1

kai13 {sato} (9)%
```

Fig.42(B)

```
kai12 {sato} (13)% sample
------------------------------------------------------------------
(1) Platform      = SUNW,SPARCserver-1000
(2) Number of CPU = 4
(3) Page size     = 4096
(4) PhyPage       = 32768
(5) AvPage        = 8272
------------------------------------------------------------------
File size =    10000  Number of Process = 1  Number of License = 2
File size =    20000  Number of Process = 1  Number of License = 2
File size =    50000  Number of Process = 1  Number of License = 2
File size =   100000  Number of Process = 1  Number of License = 2
File size =   200000  Number of Process = 1  Number of License = 2
File size =   500000  Number of Process = 1  Number of License = 2
File size =  1000000  Number of Process = 2  Number of License = 4
File size =  2000000  Number of Process = 2  Number of License = 4
File size =  5000000  Number of Process = 3  Number of License = 6
File size = 10000000  Number of Process = 3  Number of License = 6
File size = 20000000  Number of Process = 1  Number of License = 2
File size = 50000000  Number of Process = 1  Number of License = 2

kai12 {sato} (14)%
```

Fig.42(C)

```
kai12 {sato} (6)% sample
-------------------------------------------------------------------
(1) Platform      = SUNW,SPARCserver-1000
(2) Number of CPU = 4
(3) Page size     = 4096
(4) PhyPage       = 32768
(5) AvPage        = 259
-------------------------------------------------------------------
File size =    10000  Number of Process = 1  Number of License = 2
File size =    20000  Number of Process = 1  Number of License = 2
File size =    50000  Number of Process = 1  Number of License = 2
File size =   100000  Number of Process = 1  Number of License = 2
File size =   200000  Number of Process = 1  Number of License = 2
File size =   500000  Number of Process = 1  Number of License = 2
File size =  1000000  Number of Process = 1  Number of License = 2
File size =  2000000  Number of Process = 1  Number of License = 2
File size =  5000000  Number of Process = 1  Number of License = 2
File size = 10000000  Number of Process = 1  Number of License = 2
File size = 20000000  Number of Process = 1  Number of License = 2
File size = 50000000  Number of Process = 1  Number of License = 2

kai12 {sato} (7)%
```

A LIST OF REFERENCE NUMBERS

A: LICENSE MANAGEMENT UNIT

B: APPLICATION PROGRAM

C: NUMBER OF KEY DECISION UNIT

C': NUMBER OF KEY DECISION FUNCTION

D: DATABASE

D': DATABASE

LICENSE MANAGEMENT SYSTEM

TECHNICAL FIELD

The present invention relates to a license management system for software; more particularly, it relates to a license management system which can flexibly issue a license for software to a user in accordance with a use environment of the user when a software maker supplies the desired software to the user.

BACKGROUND ART

Recently, computers have been widely utilized in various fields, and not only development of the software itself but also license management for the software, is important when the software maker issues the software to the user or after issuance of the software.

In general, the software have been developed by the software maker, and have been used by the user who has a hardware (computer) based on a predetermined license contract. After the software was supplied to the user, the software maker performs the license management, i.e., checks as to whether the software is used properly based on the predetermined license contract.

Conventionally, there are mainly two types of license contracts, i.e., a floating-license system and a node-lock license system. In the former, the number of the licenses are decreased one by one for every start of the software, and are increased one by one for every termination thereof. In the latter, the hardware to be used is fixed in the user side, and the software maker issues the license at a predetermined constant price regardless the number of the software.

Further, in the former, when the user wants to operate a plurality of workstations (for example, 10) by using the same software, the software maker issues a license contract to the user at the price of ten licenses.

According to the former, the software maker has an advantage in which he can set a high unit price of the software. Furthermore, the user also has an advantage of flexibility in use of the software since he can optionally change the number of the hardware to be used.

On the other hand, in the latter, the hardware to be used in the user is fixed, and the software maker issues the license contract in a predetermined constant price regardless the number of the software and performance of the software.

According to the latter, the user has an advantage in which he can set a low unit price of the software. However, since the hardware to be used is fixed, there is no flexibility in use of the software. Further, since all the software is handled by only one hardware, there is a problem in which the whole throughput of the system becomes worse.

As explained above, there are various problems for both software maker and the user in the conventional license system. Particularly, there is a problem in which the software maker cannot issue a license, as to which sales strategy was considered. Accordingly, the software maker has always searched for and developed an optimum license management in order to supply the software, which have been developed at large expense, to the user, at a suitable price.

DISCLOSURE OF THE INVENTION

The object of the present invention is to provide a license management system enabling issuance of a license in which the sales strategy of the software maker was considered.

The present invention is a license management system for software which drives a single computer or a plurality of computers, and includes an application program for requesting a decision of the number of the license, required to drive itself and for receiving issuances of the license, a number of licenses decision unit for determining the necessary number of licenses in accordance with the request from the application program, and a license management unit for issuing the number of licenses which was determined by the number of licenses decision unit, to the application program.

The number of license decision unit includes means for determining the number of licenses based on the following multi-nominal function.

$$LK=f(x1, x2, \ldots, xn)$$

Where, LK is the number of licenses, and xn is a parameter which is needed to determine the number of license.

Further, the present invention is a license managing method in a license management system including at least a license management unit, an application program, and a number of license decision unit, and for driving a single computer or a plurality of computers, the method comprising the steps of;

delivering parameters from the application program to the number of licenses decision unit in order to substitute the number of license, which needed to start the application program, for the multi-nominal function, when the application program starts;

determining the number of license by checking values of the necessary parameters which need to determine the number of licenses in the number of licenses decision unit, substituting the determined number of license for the parameters delivered from the application program, and returning the parameters to the application program;

notifying the necessary number of licenses from the application program to the license management unit by delivering the parameters, and requesting the license; and subtracting the necessary number of licenses from the number of licenses which are held in the license management unit when the license management unit receives a normal flag from the number of licenses decision unit, and returning the normal flag to the application program when the number of licenses, which are held in the license management unit, is not negative, and issuing the license to the application program.

BRIEF EXPLANATION OF DRAWINGS

FIGS. 40(A) to 40(I) are actual function lists for determining the number of key;

FIGS. 41(A) to 41(F) are explanatory views of one example of the program; and FIGS. 42(A) to 42(C) are explanatory views of a result of execution of the same program.

BEST MODE OF CARRYING OUT THE INVENTION

FIGS. 1 to 5 are explanatory views of sales strategy in a software maker. In this specification, a license is called a "key", and the number of licenses is called "the number of keys". In the present license system, the number of keys is equal to the number of licenses, and it is possible to consider the number of keys as the same as the value of the software. However, in order to realize suitable license management, it is desirable to realize a predetermined relative relationship between the number of licenses and the number of keys (this relationship corresponds to a function "f" as mentioned below). For example, it is desirable to have the relationship in which the number of keys is proportional to the number of licenses.

The following five patterns must be considered in the sales strategy of the software maker as shown in FIGS. 1 to 5.

Figure 1:
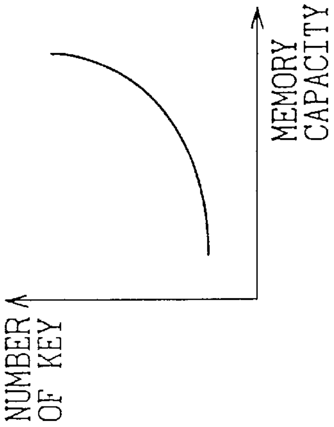
FIGS. 1 to 5 are explanatory views of sales strategy for a software maker.

As shown in FIG. 1, when the application program is particularly designed so as to operate at high speed in accordance with high speed hardware including many memories, the design of the software becomes complicated so that the software has a high value. Accordingly, when the hardware having many memories is used in a user side, the software maker should request the more number of keys to the user in accordance with the more number of memories.

Figure 2:
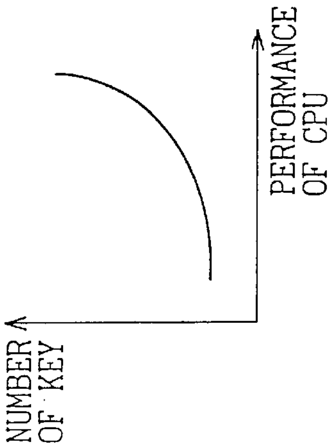

As shown in FIG. 2, in the case of FIG. 1, when a performance of the computer is high, the throughput of the computer per a unit time is also high. Accordingly, the software maker should request, a greater number of keys to the user in accordance with the higher performance of the computer.

Figure 3:
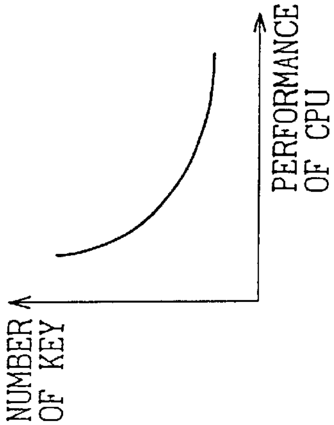

As shown in FIG. 3, in the case that the application program is not particularly designed, according to a view point of the user, since the performance of the computer becomes higher so that an appearance performance of the software also becomes higher, the application program should be operated based on less number of keys. According to this view point, the software maker should consider so as to be able to start the software based on less number of keys. However, the above is particular case. For example, when the software is on the way of development and design, and when the performance thereof is not finally determined in the software maker, the software maker wishes to use that software in the user side in order to improve the performance.

Figure 4:
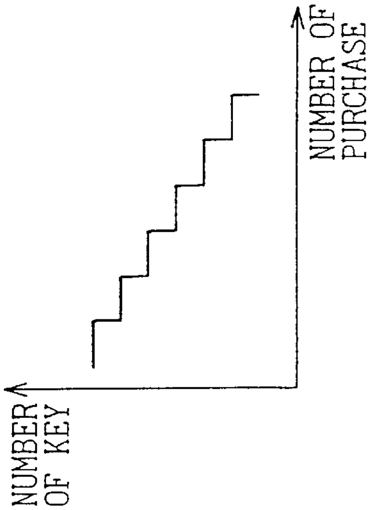

As shown in FIG. 4, for the user who buys a large amount of software, the necessary number of keys are gradually reduced in accordance with the number of purchased the keys. Accordingly, in this case, it is necessary to reduce a substantial unit price of the software in the software maker.

Figure 5:
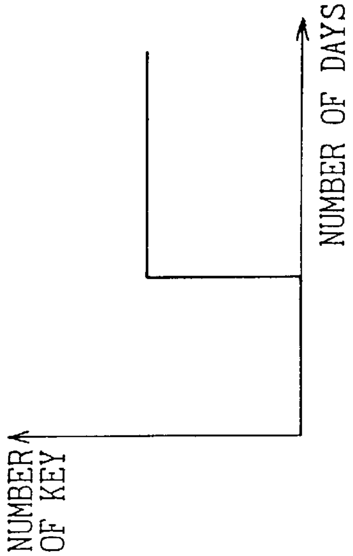

As shown in FIG. 5, the software maker supplies the software free of charge until a predetermined date (this corresponds to "the necessary number of keys is zero"), and supplies the software for a fee after that predetermined date (this corresponds to "the number of key is larger than zero").

As explained above, it is necessary to provide the license management system so as to determine the number of key in accordance with various factors in the use of the software, i.e., a factor caused by the hardware, a factor caused by the processing time, a factor caused by cost, etc.

The present invention aims to perform issuance of the number of keys enabling setting of parameters in flexibility in the software maker.

In order to solve the above problem, the present invention comprises a function for determining the necessary number of keys (the number of key decision units). The number of license decision units determines the number of licenses based on the following multi-nominal function.

$$LK=f(x1, x2, \ldots, xn) \quad (1)$$

Where, LK is the number of licenses, and xn is a parameter required to determine the number of licenses. As parameters, as explained in FIGS. 1 to 5, there are the memory capacity of the hardware, the clock speed of the system, and items which can set freely by the software maker and so on.

Further, the present invention comprises a function for acquiring the values of parameters which are needed to determine the number of keys (a parameter value acquiring, unit).

When the number of keys LK is set so as to always become "1", this becomes equivalent to the conventional system. This means that the system of the present invention is ranked to an upper position of the conventional system, and is compatible with the conventional system. Accordingly, based on the function of the present invention, it is possible to realize an issuance of the number of keys in which the sales strategy was considered in the software maker. Further, it is possible to utilize a fixed number of keys in the conventional art. As a result, it is possible to provide an improved license management system for the software.

Figure 6:
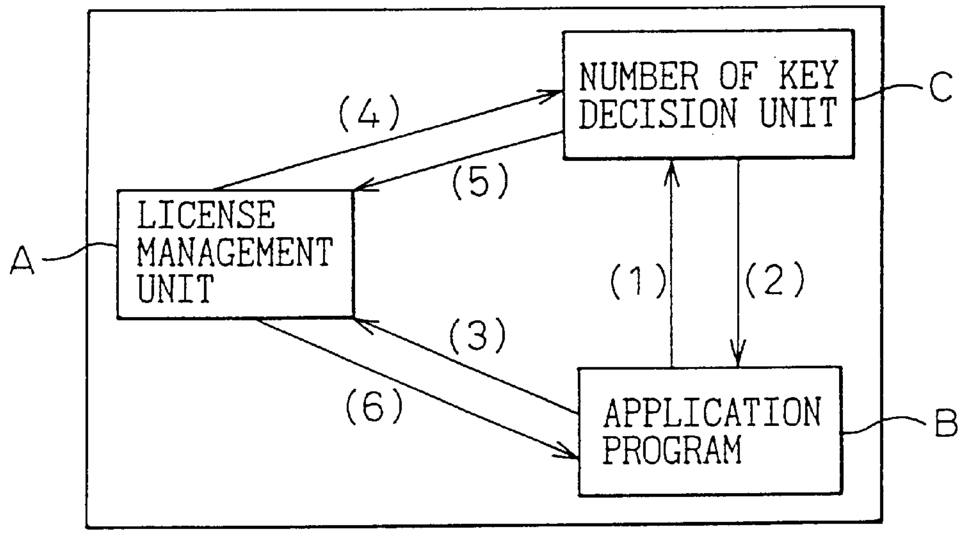
FIG. 6 is a basic structural view of a first embodiment of a license management system according to the present invention.

FIG. 6 is a basic structural view of the first embodiment of the license management system according to the present invention. In the drawing, A denotes a license management unit, B denotes an application program, and C denotes a number of key decision unit (daemon program). As is known, a daemon program is the program which is automatically executed in a background based on an operating system (OS). In the present invention, all transmission and reception of the data are performed through a network UNIX systems using, for example, the TCP/IP (Transmission Control Protocol/Internet Protocol). In the following drawings, each numeral denotes an order of process.

Process 1: When the application program B starts, it delivers parameters (for example, NoOfKeys) to the number of license decision unit in order to substitute a necessary number of keys required to start the application program.

Process 2: The number of keys decision unit C checks values of the necessary parameters which are needed to determine the number of keys and determines the number of keys, substitutes the determined number of keys for the parameters (NoOfKeys) delivered from the application program, and returns the parameters to the application program B.

Process 3: The application program B notifies the necessary number of keys to the license management unit A by delivering the parameters (NoOfKeys), and requests the license.

Process 4: The license management unit A notifies the number of keys (NoOfKeys), which are notified from the application program, to the number of keys decision unit C in order to confirm whether the number of keys requested by the application program B is correct.

Process 5: The number of keys decision unit C compares the number of keys, which is notified from the application program to the license management unit A, with the necessary number of keys which notified to the application program. When the number of keys is correct, the number of keys decision unit C returns a normal flag to the license management unit A.

The processes 4 and 5 are optional because these steps are used for confirmation as to whether a correct request is performed.

Process 6: When the license management unit A receives the normal flag from the number of keys decision unit C, the license management unit subtracts the necessary number of keys from the number of keys which are held therein, returns the normal flag to the application program B when the number of keys which are held in the license management unit, is not negative, and issues the license to the application program B. When the application program B receives issuance of the license, it becomes an executable application program. If the abnormal flag, which indicates rejection, for example, the flag indicating that the number of keys become negative, is returned from the license management unit A, the application program is terminated at that time.

Figure 7:
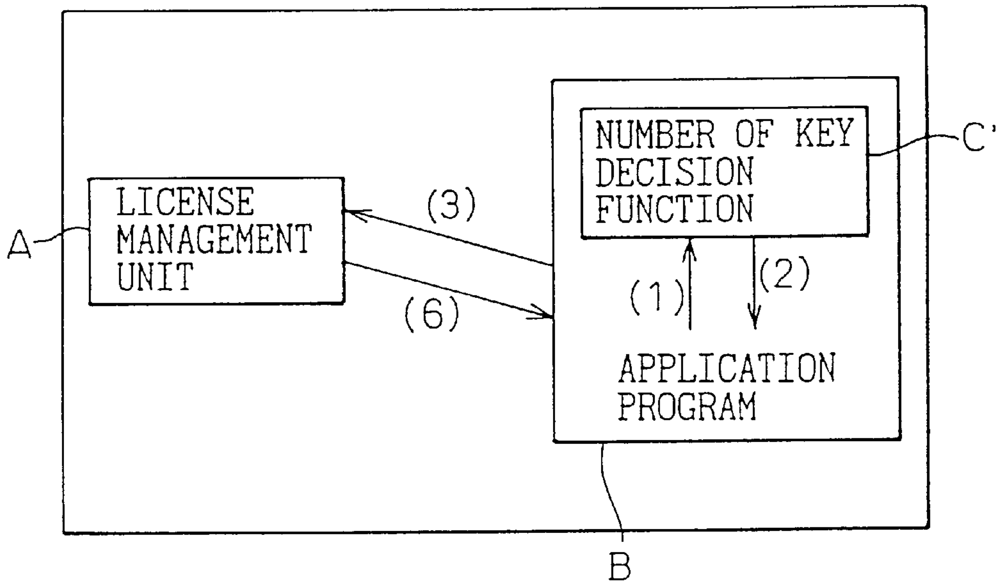
FIG. 7 is a basic structural view of a second embodiment of a license management system according to the present invention.

FIG. 7 is a basic structural view of the second embodiment of the license management system according to the present invention. In the above first embodiment, the number of keys decision unit C operates as an independent daemon program. In this embodiment, the number of keys decision function C' is included within the application program as a function call. In this case, different from the first embodiment, the process 1 is applied as the function call of a variable argument, and the process 2 is applied as a return value thereof. Further, the number of keys is determined by the application program including the number of keys decision unit C, itself based on the formula (1).

Process 1: When the application program B starts, it delivers the parameter (NoOfKeys) to the number of key decision function C' in order to receive the number of keys required to start itself.

Process 2: The number of keys decision function C' checks the necessary value of the parameter, and determines the number of keys. Further, the number of keys decision function C' substitutes the values for the parameters delivered from the application program B, and returns the parameter (NoOfKeys) with the values to the application program B.

Process 3: The application program B notifies the necessary number of keys to the license management unit A by delivering the parameter (NoOfKeys), and requests the license.

The processes 4 and 5 in the first embodiment are omitted because these steps are optional.

The process 6: When the license management unit A receives the request from the application program B, it subtracts the necessary number of keys from the number of keys which are held in the license management unit A itself. As a result of subtraction, if the stored number of keys is not negative, the license management unit A returns the normal flag to the application program B, and issues the license thereto. When the application program B receives the issuance of the license, it becomes the executable application program. If the abnormal flag is returned from the license management unit A, the application program B terminates at that time.

Figure 8:
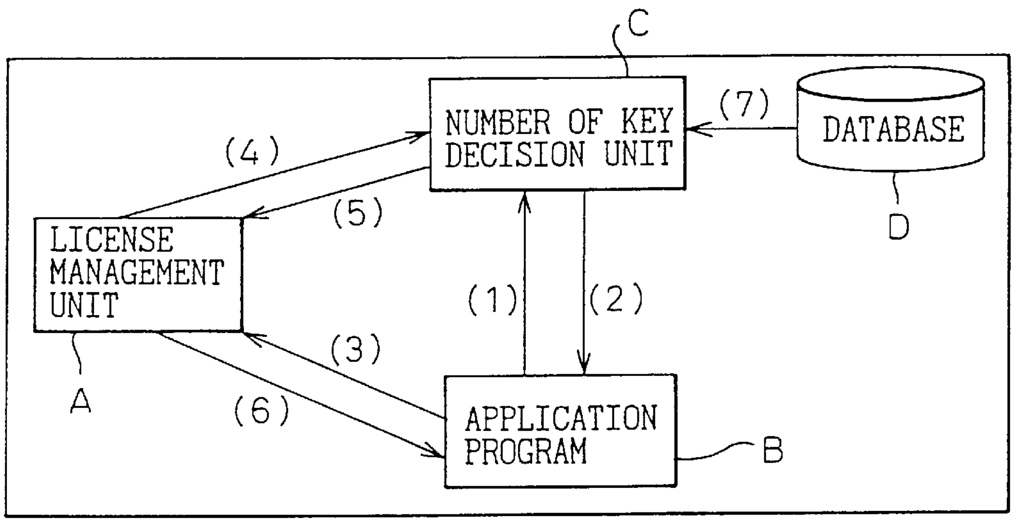
FIG. 8 is a basic structural view of a third embodiment of a license management system according to the present invention.

FIG. 8 is a basic structural view of the third embodiment of the license management system according to the present invention. In the above first embodiment, when changing the multi-nominal function according to the situation at the software maker, a method of directly changing the number of keys decision unit C is employed to change multi-nominal function. In the present embodiment, a database D for determining the multinominal function is separately provided in order to read the multi-nominal function to the number of keys decision unit C. In this case, when changing the multi-nominal function, the database D is changed so that it is not necessary to change the multi-nominal function in the number of keys decision unit C.

Process 1: When the application program B starts, it delivers the parameter (NoOfKeys) to the number of keys decision function C in order to substitute the number of keys which it needs to start itself.

Process 2: The number of keys decision unit C reads the data from the database D (see process 7), and determines the multi-nominal function. Further, the number of keys decision function C checks the necessary value of the parameter, and determines the number of keys. Still further, the number of key decision function C substitutes the values for the parameters delivered from the application program B, and returns the parameters with the values to the application program B.

Process 3: The application program B notifies the necessary number of keys to the license management unit A by delivering the parameter (NoOfKeys), and requests the license.

The processes 4 and 5 in the first embodiment are omitted because these steps are optional.

The process 6: When the license management unit A receives the normal flag from the number of keys decision function C, it subtracts the necessary number of keys from the number of keys which are held in the license management unit A itself. As a result of subtraction, if the stored number of keys is not negative, the license management unit A returns the normal flag to the application program B, and issues the license thereto. When the application program B receives the issuance of the license, it becomes the executable application program. If the abnormal flag is returned from the license management unit A, the application program B terminates at that time.

Figure 9:
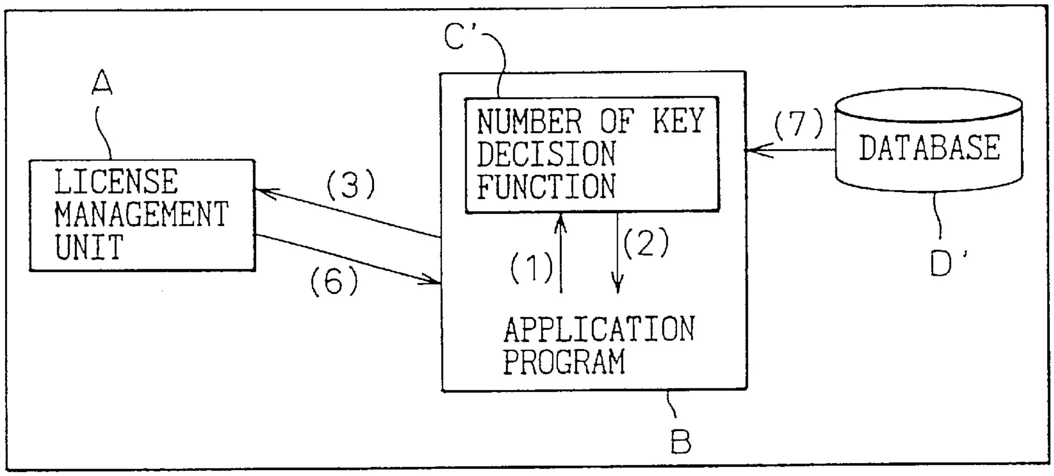
FIG. 9 is a basic structural view of a fourth embodiment of a license management system according to the present invention.

FIG. 9 is a basic structural view of the fourth embodiment of the license management system according to the present invention. In the above second embodiment, the number of keys decision function C' is included within the application program B as the function call. In the present embodiment, a database D' for determining the multi-nominal function is separately provided in order to read the multi-nominal function to the number of keys decision unit C'. In this case, when changing the multi-nominal function, the database D' is changed so that it is not necessary to change the multi-nominal function in the number of keys decision function C'.

Process 1: When the application program B starts, it delivers the parameter (NoOfKeys) to the number of keys decision function C' in order to receive the number of keys which it needs to start itself.

Process 2: The number of keys decision unit C' reads the data from the database D' (see process 7), and determines the multi-nominal function. Further, the number of keys decision function C' checks the necessary value of the parameter, and determines the number of keys. Still further, the number of keys decision function C' substitutes the values for the parameters delivered from the application program B, and returns the parameters with the values to the application program B.

Process 3: The application program B notifies the necessary number of keys to the license management unit A by delivering the parameter (NoOfKeys), and requests the license.

The processes 4 and 5 in the first embodiment are omitted because these steps are optional.

The process 6: When the license management unit A receives the request from the application program B, it subtracts the necessary number of keys from the number of keys which are held in the license management unit A itself. As a result of subtraction, if the stored number of keys is not negative, the license management unit A returns the normal flag to the application program B, and issues the license thereto. When the application program B receives the issuance of the license, it becomes the executable application program. If the abnormal flag is returned from the license management unit A, the application program B terminates at that time.

The processes shown in FIGS. 6 to 9 are explained in detail with reference to the drawings. The following explanations are given in detail to the processes 3 and 6 between the license management unit A and the application program B.

Conventionally, the license management unit A checked whether the operation of the application program was normal, in such a way that one license daemon (daemon program) communicates with each application program.

In this method, however, the license daemon must have many complicated communications with each application program. For example, the license daemon sends a check request for checking a predetermined item to each application program, and each application program returns an answer for the check request to the daemon program. In this case, since the answer is returned simultaneously from each application program to the daemon program, many answers become wait states in the license daemon. This is because many loads are applied to the license daemon. As a result, the processing time for each answer in the license daemon is delayed so that the performance of the software also becomes worse.

Accordingly, the present invention aims to reduce the loads in the license daemon and to eliminate the delay of the processing time in the software (i.e., application program).

Accordingly to achieve the above purpose, one private license daemon (APSM: Application Program Server Manager) and one private application manager (APCM: Application Program Client Manager) are provided in addition to the license daemon and the application program, and various communications are performed between the private license daemon APSM and the private application manager APCM as explained in detail below.

Figure 10:
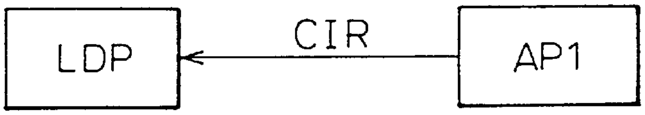
FIG. 10 is an explanatory view of a start process between a license daemon and an application program.

FIG. 10 is an explanatory view of the start process between the license daemon and the application program. When a user performs the start process of the application program, the application program AP1 sends a request CIR (Check-In Request) to the license daemon LDP in order to acquire an approval of execution (i.e., license).

Figure 11:
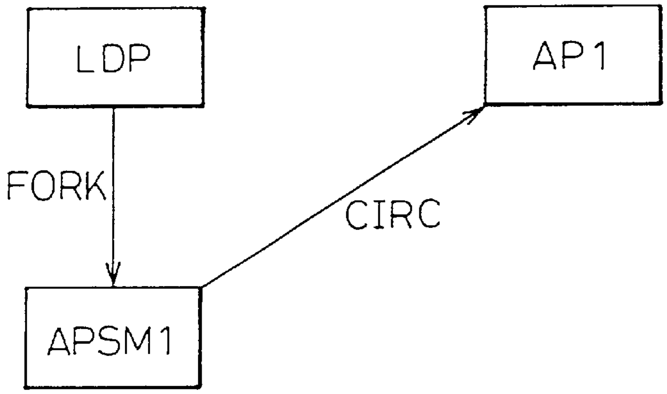
FIG. 11 is an explanatory view of a fork process in the license daemon.

FIG. 11 is an explanatory view of the fork process in the license daemon. The license daemon LDP generates a fork instruction in order to establish the private license daemon APSM1. The private license daemon APSM1 sends the approval of execution CIRC (Check-In Request Confirmation) to the application program AP1 and issues the license. In this case, the following three states are considered.

a) When the approval of execution CIRC cannot be obtained from the private license daemon APSM1, the application program AP1 terminates the process.

b) When the approval of execution CIRC can be obtained from the private license daemon APSM1, but it includes "invalid" contents, the application program AP1 notifies an invalidation to the user.

c) When the approval of execution CIRC can be obtained from the private license daemon APSM1, and it includes "valid" contents, the application program AP1 generates the fork instruction in order to establish the private application manager APCM1.

Figure 12:
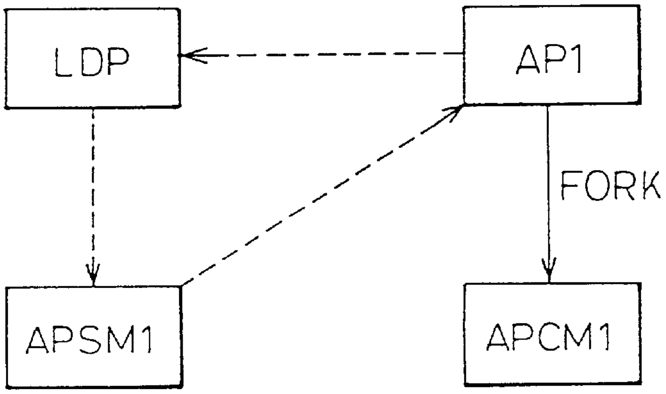
FIG. 12 is an explanatory view of the fork process in the application program.

FIG. 12 is an explanatory view of the fork process in the application program. As explained in the above item (c), when the approval of the execution CIRC can be obtained from the private license daemon APSM1, and it includes "valid" contents, the application program AP1 generates the fork instruction in order to establish the private application manager APCM1. After this process, the communications as to the license management are performed between the private license daemon APSM1 and the private application manager APCM1. The application program AP1 starts to execute a proper program itself.

Figure 13:
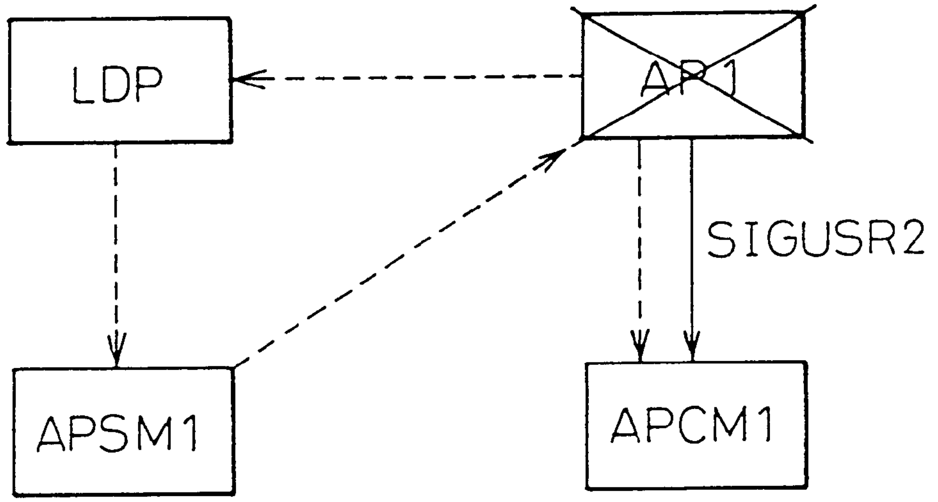
FIG. 13 is an explanatory view of a termination process of the application program.

FIG. 13 is an explanatory view of the termination process of the application program. When the user performs the termination process of the application program AP1, the application program AP1 sends a request for the termination SIGUSR2 (one kind of signal in UNIX) to the private application manager APCM1, and the application program AP1 is terminated.

Figure 14:
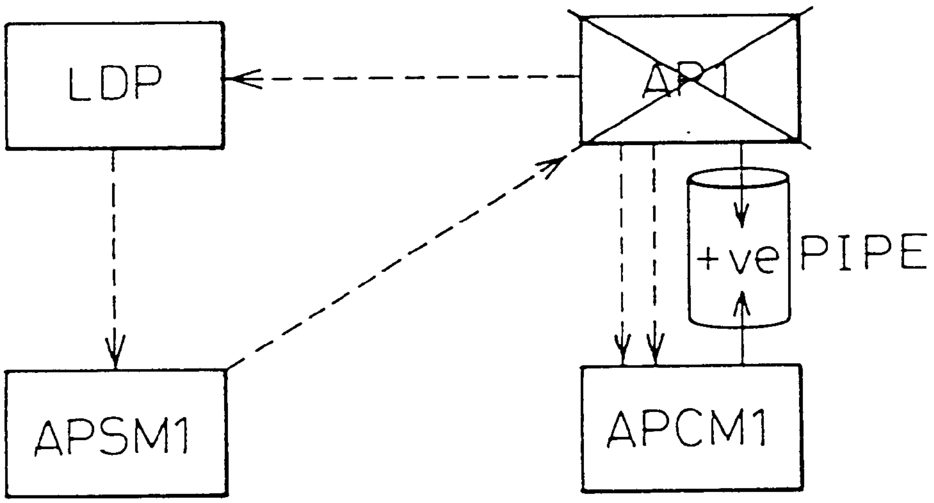
FIG. 14 is an explanatory view of a compulsory termination from a private application manager.

FIG. 14 is an explanatory view of the compulsory termination from the private application manager. For the case, if the application program does not terminate after sending the request for the termination SIGUSR2 accidentally, the private application manager APCM1 sets an invalid information +ve (positive value) into a pipe. The application program AP1 reads the invalid information +ve and terminates itself.

Figure 15:
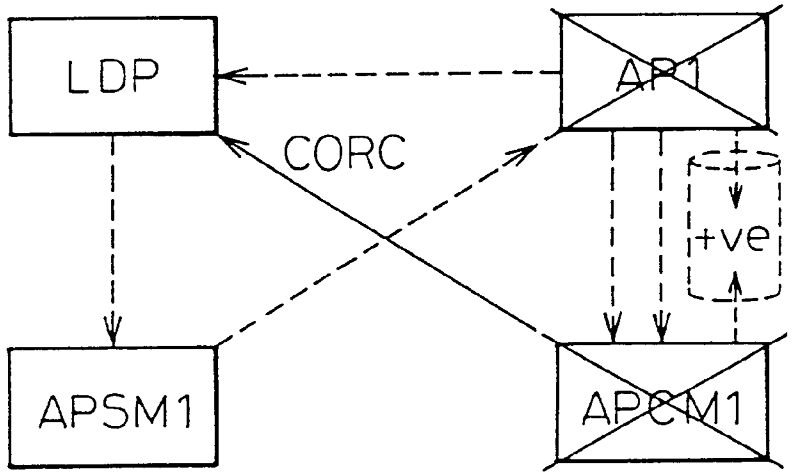
FIG. 15 is an explanatory view of a termination report of the application program.

FIG. 15 is an explanatory view of the termination report of the application program. When the application program AP1 terminates, the private application manager APCM1 sends the termination report CORC (Check-Out Request Confirmation) indicating the termination of the application program AP1 to the license daemon LDP, and the private application manager APCM1 terminates.

Figure 16:
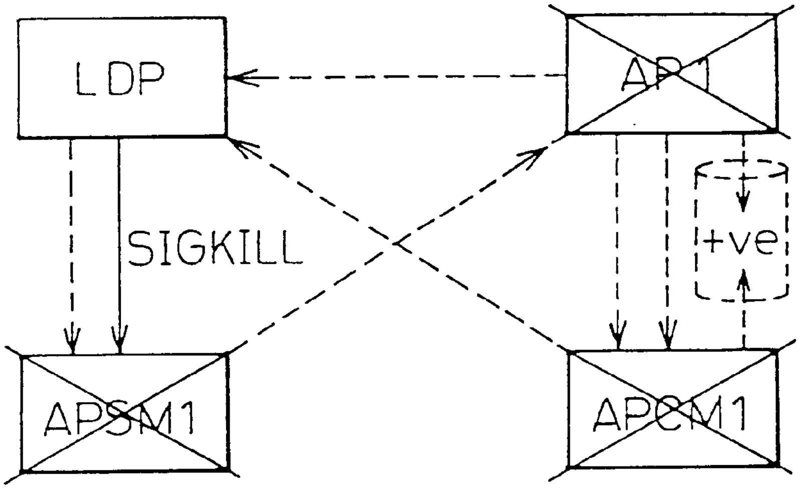
FIG. 16 is an explanatory view of the termination process to the private license daemon.

FIG. 16 is an explanatory view of the termination process of the private license daemon. Finally, the license daemon LDP writes the information into the database after the application program AP1 terminates, and generates a termination instruction SIGKILL (one kind of signal in UNIX) to the private license daemon APSM1 so as to terminate the private application daemon APSM1 itself.

Next, the polling operation between the private license daemon and the private application manager is explained in detail below. The periodical polling is performed between the private license daemon and the private application manager in order to check whether the normal communication is performed therebetween.

Figure 17:
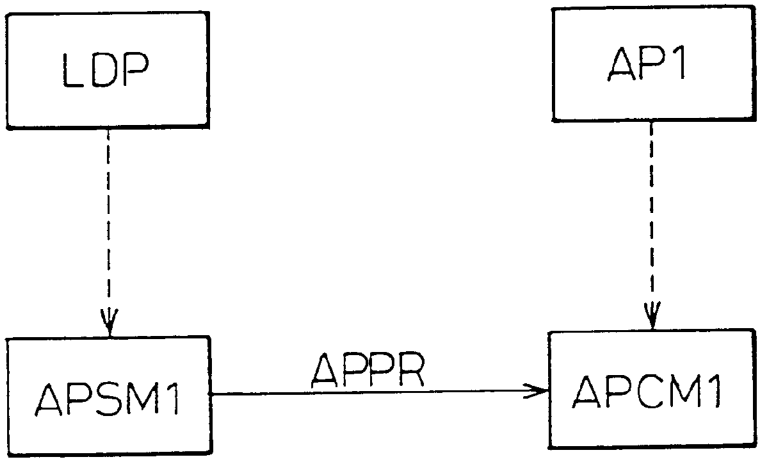
FIG. 17 is an explanatory view of a check request from the private license daemon.

FIG. 17 is an explanatory view of the check request from the private license daemon. The private license daemon APSM1 sends the check request APPR (Application Program Poll Request) to the private application manager APCM1 in order to check whether the private application manager APCM1 is operating normally.

Figure 18:
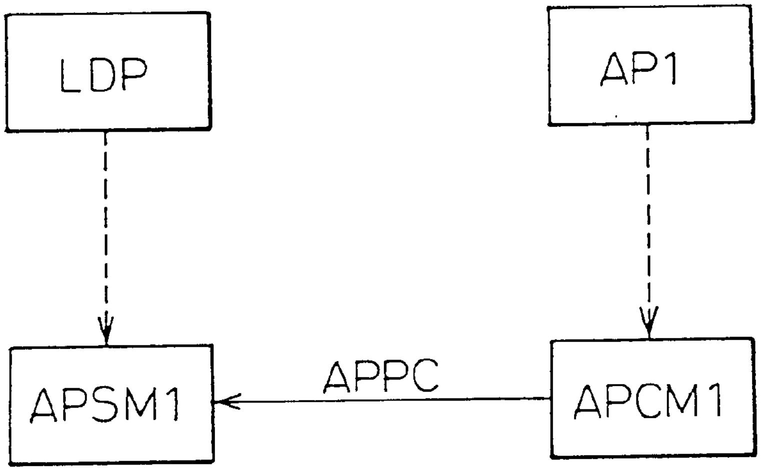
FIG. 18 is an explanatory view of a normal notification from the private application manager.

FIG. 18 is an explanatory view of the normal notification from the private application manager. The private application manager APCM1 sends the normal notification APPC (Application Program Poll Conformation) to the private license daemon APSM1 when the check of contents from the private license daemon APSMl and the check of contents in the private application manager itself APCM1 are successful.

Figure 19:
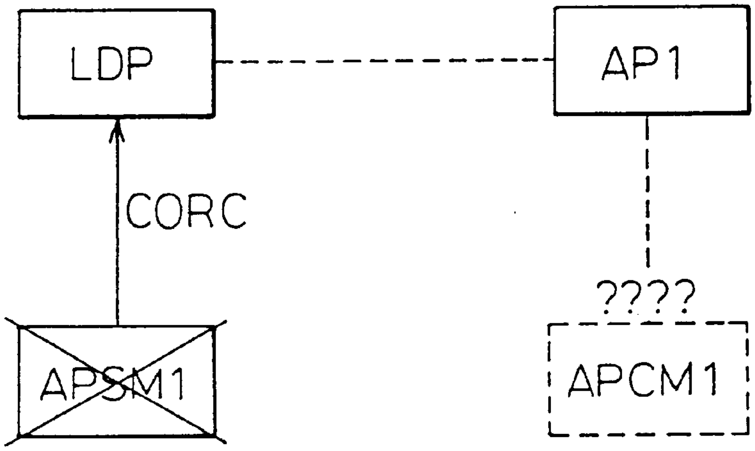
FIG. 19 is an explanatory view of a restart process from the private license daemon.

FIG. 19 is an explanatory view of the restart process from the private license daemon. When the private license daemon APSM1 gets an abnormal response from the private application manager APCM1 (Heart beat message exchange fails), the private license daemon APSM1 sends the CORC message to the license daemon LDP and terminates itself.

Figure 20:
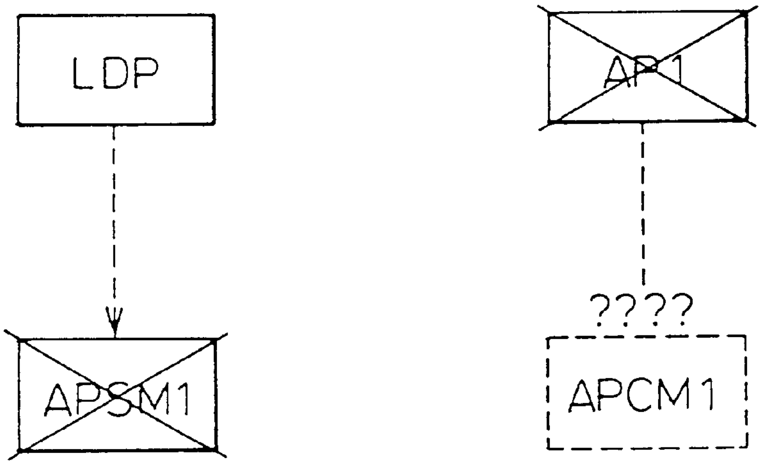
FIG. 20 is an explanatory view of a license releasing process in the private license daemon.

FIG. 20 is an explanatory view of the license releasing process in the private license daemon. The license daemon LDP invalidates the application program AP1, and releases the license keys which was assigned to the application program AP1.

Next, the polling operation from the private application manager APCM1 to the private license daemon APSM1 is explained below.

Figure 21:
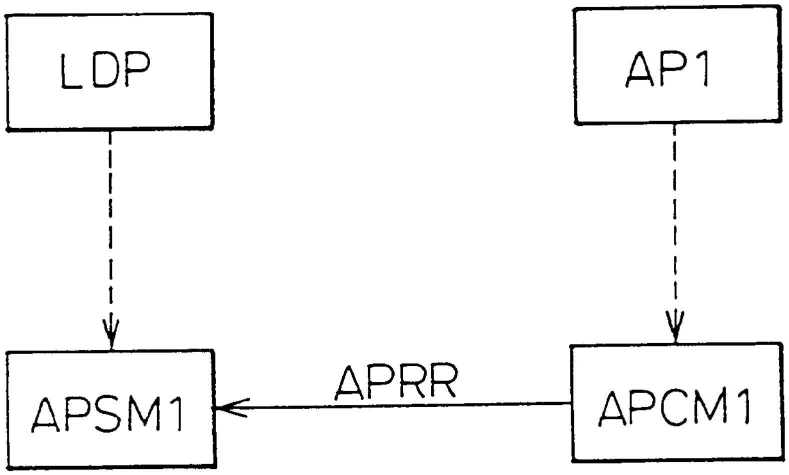
FIG. 21 is an explanatory view of the check request from the private application manager to the private license daemon.

FIG. 21 is an explanatory view of the check request from the private application manager to the private license daemon. The private application manager APCM1 sends the check request APRR (Application Program Re-validation Request) to the private license daemon APSM1.

Figure 22:
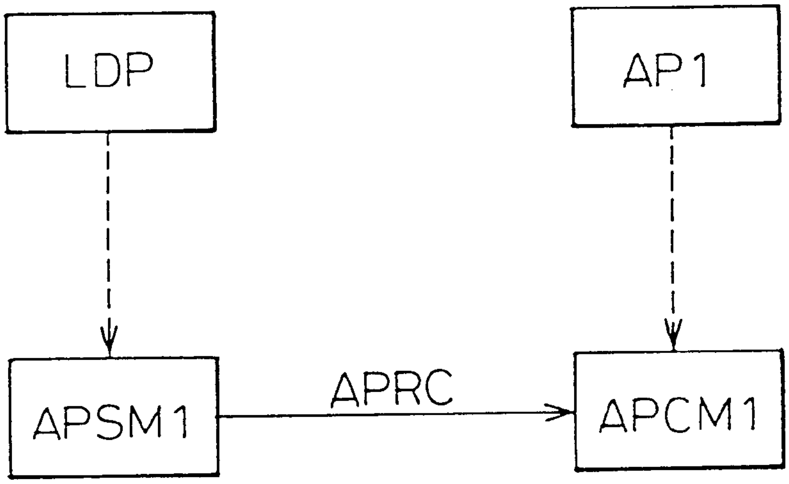
FIG. 22 is an explanatory view of the normal notification from the private license daemon to the private application manager.

FIG. 22 is an explanatory view of the normal notification from the private license daemon to the private application manager. The private license daemon APSM1 sends the normal notification APRC (Application Program Re-validation Confirmation) to the private application manager APCM1 when the check of the contents from the private application manager APCM1 and the check of the contents in the private license daemon itself are successful.

Figure 23:
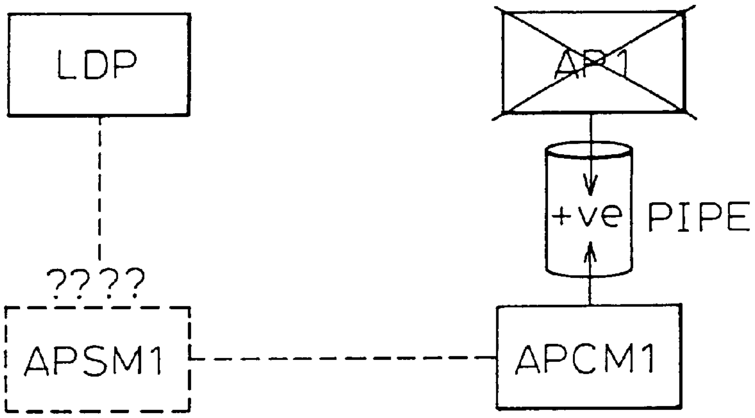
FIG. 23 is an explanatory view of invalid information in the private application manager.

FIG. 23 is an explanatory view of the invalid information in the private application manager. When the check of the contents in the private application manager APCM1 and the check of the contents in the private license daemon APSM1 are unsuccessful, the private application manager APCM1 sets an invalid information +ve (positive value) into the pipe. The application program AP1 reads the invalid information and terminates itself.

Figure 24:
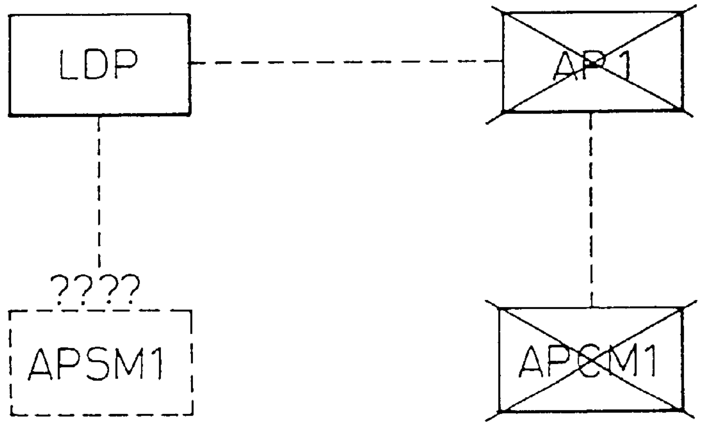
FIG. 24 is an explanatory view of the termination process in the private application manager.

FIG. 24 is an explanatory view of the termination process in the private application manager. The private application manager APCM1 terminates itself after sending of the termination instruction to the parent application program.

Next, the abnormal termination of the private license daemon is explained below.

Figure 25:
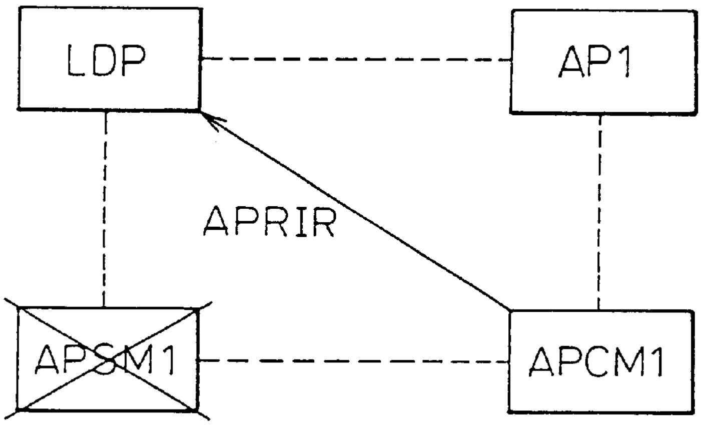
FIG. 25 is an explanatory view of a restart in the private license daemon.

FIG. 25 is an explanatory view of the restart in the private license daemon. When the private application manager APCM1 detects the abnormal termination of the private license daemon APSM1, the private application manager APCM1 sends the request APRIR (Application Program Re-initiation Confirmation) to the license daemon LDP in order to restart the private license daemon APSM1.

Figure 26:
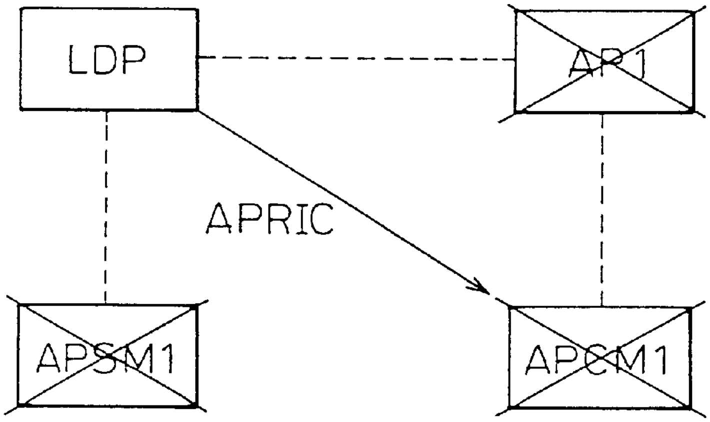
FIG. 26 is an explanatory view of an invalid notification from the license daemon.

FIG. 26 is an explanatory view of the invalid notification from the license daemon. When the license daemon detects that the private license daemon APSM1 invalidates the request for a restart, the license daemon LDP sends the notification APRIC (Application Program Re-initiation Confirmation) indicating that the private license daemon APSM1 has not restarted, to the private application manager APCM1. Further, the private application manager APCM1 terminates itself, and the application program AP1 terminates.

Figure 27:
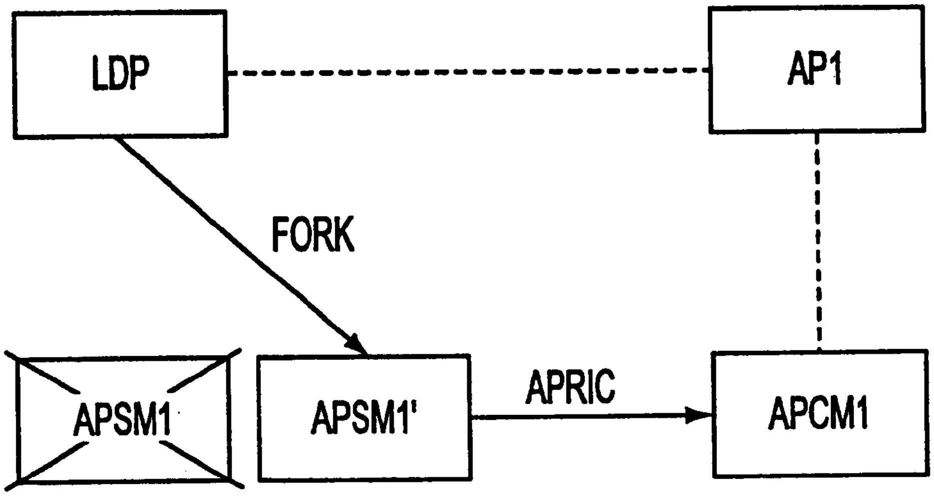
FIG. 27 is an explanatory view of a restart notification from the license daemon.

FIG. 27 is an explanatory view of the restart notification from the license daemon. When the license daemon LDP detects that the private license daemon APSM1 validates the request of restart, the license daemon LDP provides a new private license daemon APSM1' based on the fork instruction. The new private license daemon APSM1' updates the database, and sends the notification APRIC indicating that the private license daemon is restarted, to the private application manager APCM1.

Figure 28:
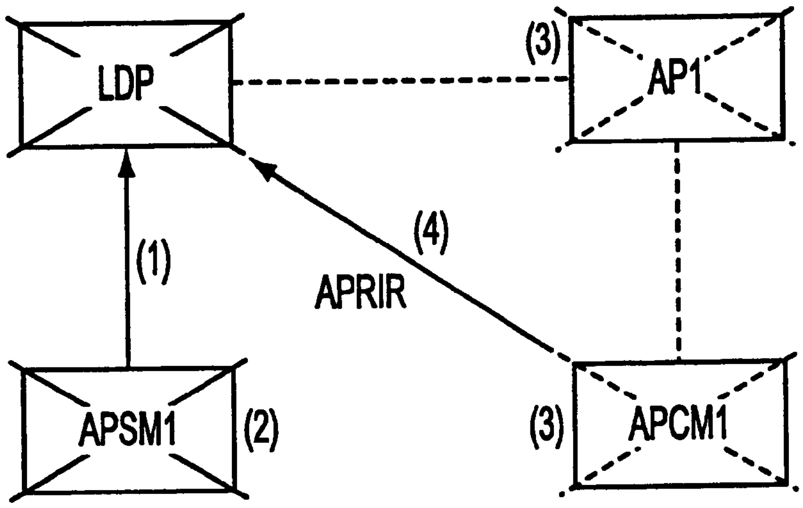
FIG. 28 is an explanatory view of a polling process from the private license daemon to the license daemon.

FIG. 28 is an explanatory view of the polling process from the private license daemon to the license daemon. The private license daemon APSM1 performs the periodical polling to the license daemon LDP. If the private license daemon APSM1 finds an EXIT of the license daemon LDP (step 1), the private license daemon APSM1 terminates itself (step 2). Accordingly, the normal operation of the application program AP1 is interrupted by the private application manager APCM1 (step 3), and the private application manager APCM1 loops trying to send APRIR to the LDP (step 4).

Figure 29:
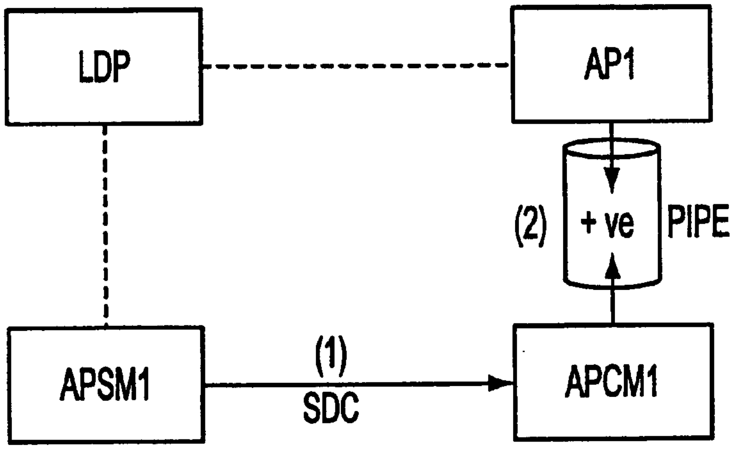
FIG. 29 is an explanatory view of the termination process in the license daemon.

FIG. 29 is an explanatory view of the termination process in the license daemon. The license daemon LDP terminates in accordance with a request from a system administrator. There are two modes for termination, i.e., a normal termination (TR1) and another termination (TR2). The license daemon LDP checks a valid application program AP1 having the license key after reception of the request of termination TR2, and the private license daemon APSM1 sends a termination instruction SDC (Shut Down Command) to the private application manager APCM1 (step 1).

When the private application manager APCM1 receives the termination instruction SDC from the private license daemon APSM1, the private application manager APCM1 deals with this as a preferential message, and immediately determines termination itself. The private application manager APCM1 forces the application program AP1 to surely send the instruction SIGUSR2 (one kind of signal in UNIX) to the private application program APCM1 before termination of the application program AP1 (step 2). The private application program APCM1 performs the normal termination after reception of the instruction SIGUSR2 from the application program AP1 in accordance with the processes shown in FIGS. 13 to 16.

Figure 30:
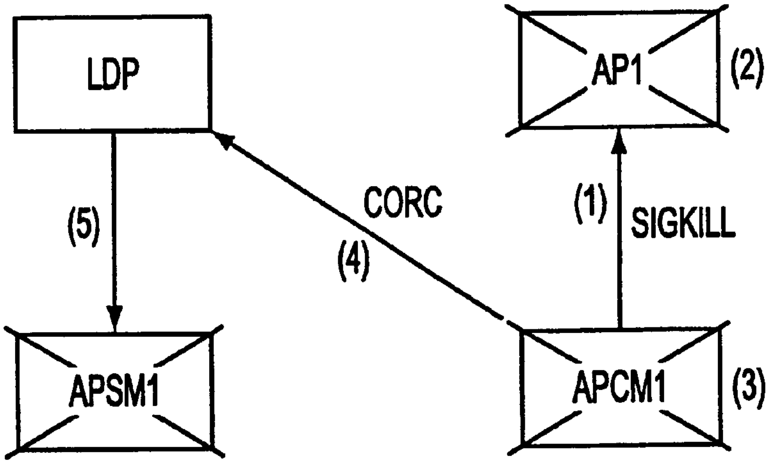
FIG. 30 is an explanatory view of the termination process in the license daemon, when the private application manager APCM1 does not receive the instruction COR from the application program AP1 within a predetermined time in the process.

FIG. 30 is an explanatory view of the termination process in the license daemon, when the private application manager APCM1 does not receive the instruction SIGUSR2 from the application program AP1 within a predetermined time in the process shown in FIG. 29. The private application manager APCM1 sends the signal SIGKILL to the application program AP1 (step 1) so that the application program AP1 terminates (step 2).

The private application manager APCM1 terminates itself after a predetermined time (step 3), and notifies this termination to the license daemon LDP using the instruction CORC (step 4). In this case, the license daemon LDP waits for the instruction CORC from the private application manager APCM1 during a predetermined time. If the license daemon LDP does not receive the instruction CORC from the private application manager APCM1, the license daemon LDP terminates the private license daemon APSM1 (step 5).

Figure 31:
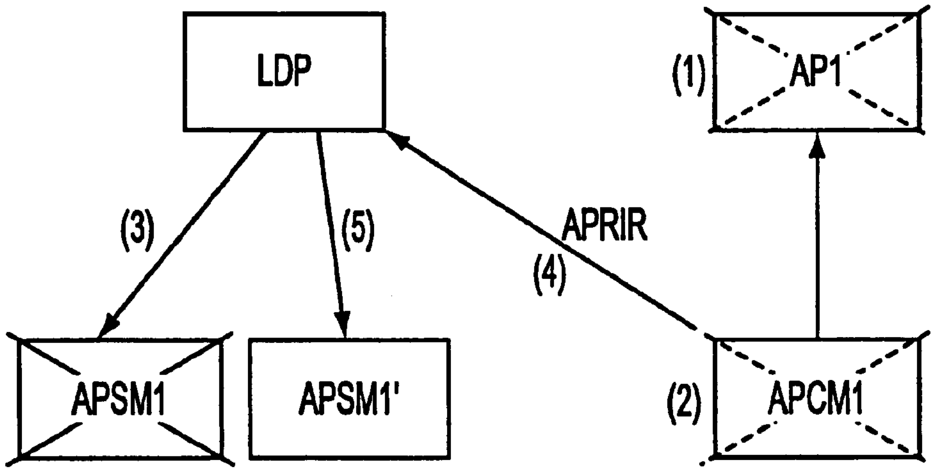
FIG. 31 is an explanatory view of an abnormal termination in the license daemon.

FIG. 31 is an explanatory view of the abnormal termination in the license daemon. When the license daemon LDP terminates abnormally, the private application manager APCM1 interrupts the normal operation in the application program AP1 (step 1), and interrupts itself (step 2). When the license daemon LDP restarts after abnormal termination, the license daemon LDP checks whether the private license daemon APSM1 terminated after abnormal termination (step 3).

The license daemon LDP checks the pending state of the instruction APRIR in the private application manager APCM1. If the instruction APRIR is pending in the private application manager APCM1, the license daemon LDP receives the instruction APRIR from the private application manager APCM1 (step 4). The private license daemon APSM1' recovers only when the license daemon LDP received the instruction APRIR from the private application manager APCM1 (step 5). The license daemon LDP starts normal operation.

Figure 32:
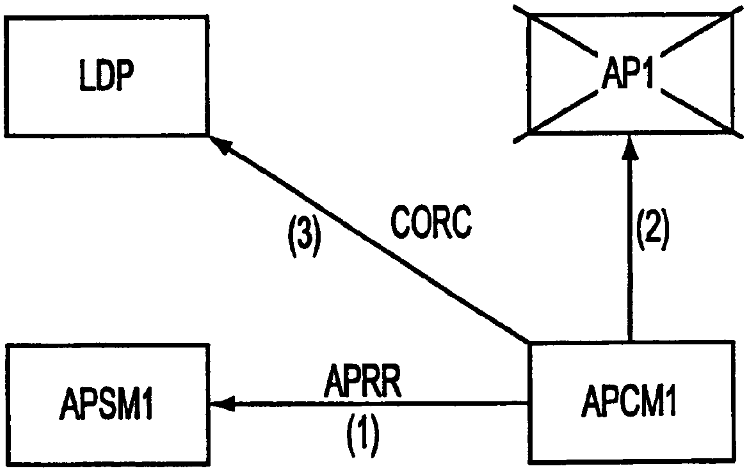
FIG. 32 is an explanatory view of the abnormal termination in the application program.

FIG. 32 is an explanatory view of the abnormal termination in the application program. When the application program AP1 terminates without sending of the instruction SIGUSR2 to the private application manager APCM1, the private application manager APCM1 sends the instruction APRR to the private license daemon APSM1 (step 1), and checks existence of the application program AP1 (polling) (step 2). If the private application manager APCM1 finds that the application program AP1 terminated without notifying to the private application manager APCM1, the private application manager APCM1 sends the instruction CORC to the license daemon LDP (step 3).

Figure 33:
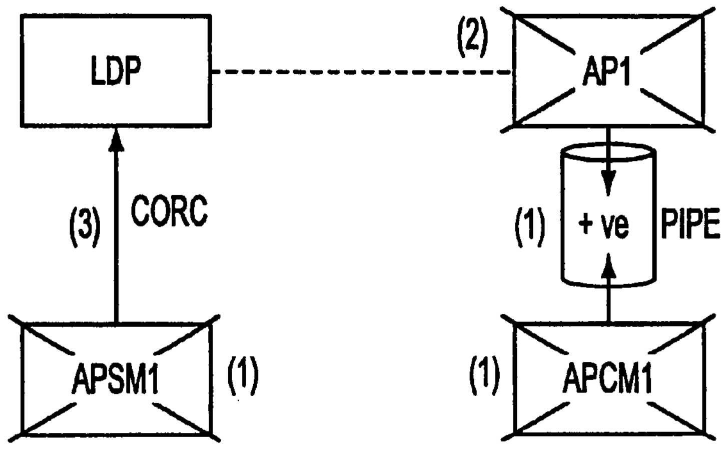
FIG. 33 is an explanatory view of the abnormal termination between the license daemon and the private application manager.

FIG. 33 is an explanatory view of the abnormal termination of the private license daemon and the private application manager. After the private application manager APCM1 terminates (step 1), the application program AP1 also terminates after checking the information +ve (positive value) of the pipe provided between the application program AP1 and the private application manager APCM1 (step 2). The license daemon LDP receives the signal CORC from the private license daemon APSM1 (step 3), and releases the license keys for the application program AP1.

Figure 34:
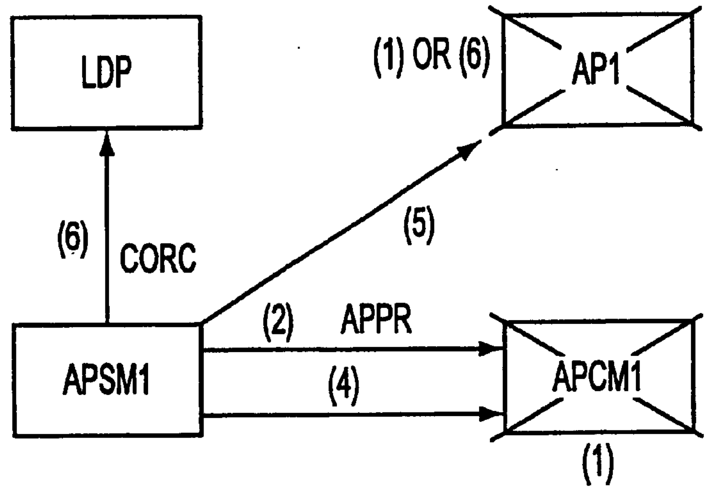
FIG. 34 is an explanatory view of the abnormal termination in both the application program and the private application manager.

FIG. 34 is an explanatory view of the abnormal termination in both application program and the private application manager. When both the application program AP1 and the private application manager APCM1 terminated abnormally without notifying to either the license daemon LDP or the private license daemon APSM1 (step 1), the private license daemon APSM1 does not acquire the confirmation APPC (Application Program Poll Confirmation) for the request APPR (Application Program Poll Request) (step 2).

After the private license daemon APSM1 found the termination of the private application manager APCM1 (step 4), the private license daemon APSM1 checks for the existence of the application program AP1. If the application program AP1 exists, the private license daemon APSM1 waits for termination of the application program AP1 by polling thereto (step 5). After the above process, the private license daemon APSM1 notifies the termination of the application program AP1 to the license daemon LDP using the instruction CORC (step 6). The license daemon LDP releases the license keys assigned to the application program AP1.

Figure 35:
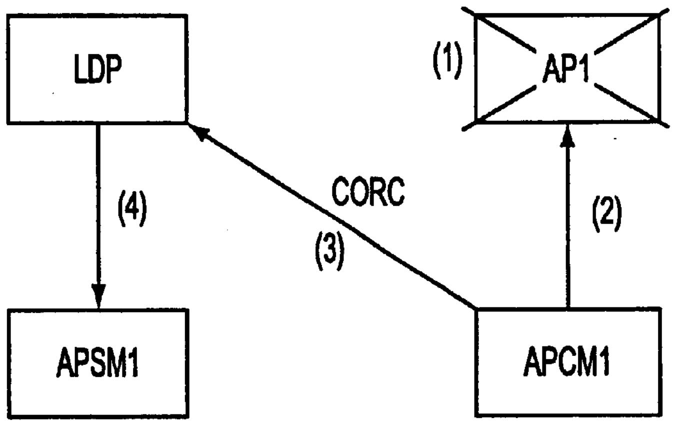
FIG. 35 is an explanatory view of the abnormal termination in both the application program and the private license daemon.

FIG. 35 is an explanatory view of the abnormal termination in both application program and the private license daemon. When the application program AP1 terminates abnormally (step 1), the private application manager APCM1 detects this abnormal termination (step 2) and sends the confirmation CORC to the license daemon LDP (step 3). The license daemon LDP releases all license keys which are held in the application program AP1 and terminates the private license daemon APSM1 (step 4). If the private license daemon APSM1 has already terminated, there is no problem.

Figure 36:
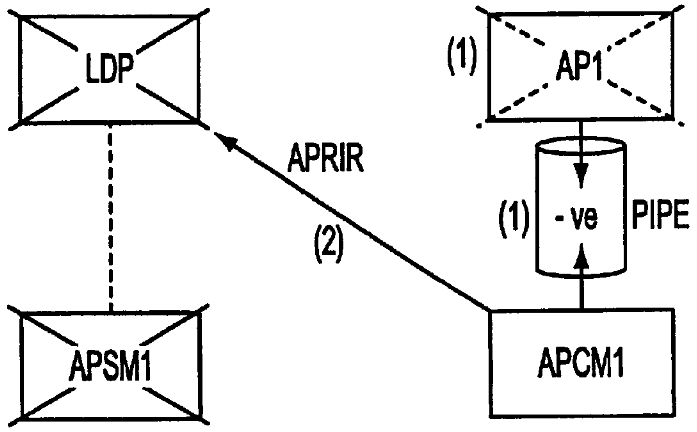
FIG. 36 is an explanatory view of the abnormal termination in both the license daemon and the private license daemon.

FIG. 36 is an explanatory view of the abnormal termination in both license daemon and the private license daemon. There are two cases in the termination of the license daemon LDP and the private license daemon APSM1 as follows. 1) Both the license daemon LDP and the private license daemon APSM1 are killed by the signal SIGKILL. 2) The license daemon LDP is abnormally killed, the private license daemon APSM1 checks the license daemon LDP. When the private license daemon APSM1 found that the license daemon LDP terminated and executed the EXIT, the private license daemon APSM1 is killed by itself.

In this situation, the private application manager APCMl interrupts the application program AP1 after setting of information –ve (negative value) to the pipe between the application program AP1 and the private application manager APCM1 (step 1), and sends the request APRIR to the license daemon LDP (step 2).

Figure 37:
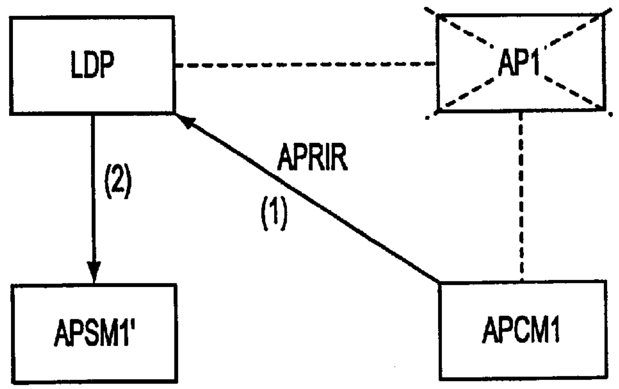
FIG. 37 is an explanatory view when the license daemon LDP restarts after the situation described in the explanation of FIG. 36.

FIG. 37 is an explanatory view when the license daemon LDP restarts after the situation described in the explanation of FIG. 36. When the license daemon LDP restarts, it recognizes the request APRIR (step 1), and recovers a new private license daemon APSM1' in order to communicate with the private application manager APCM1.

Figure 38:
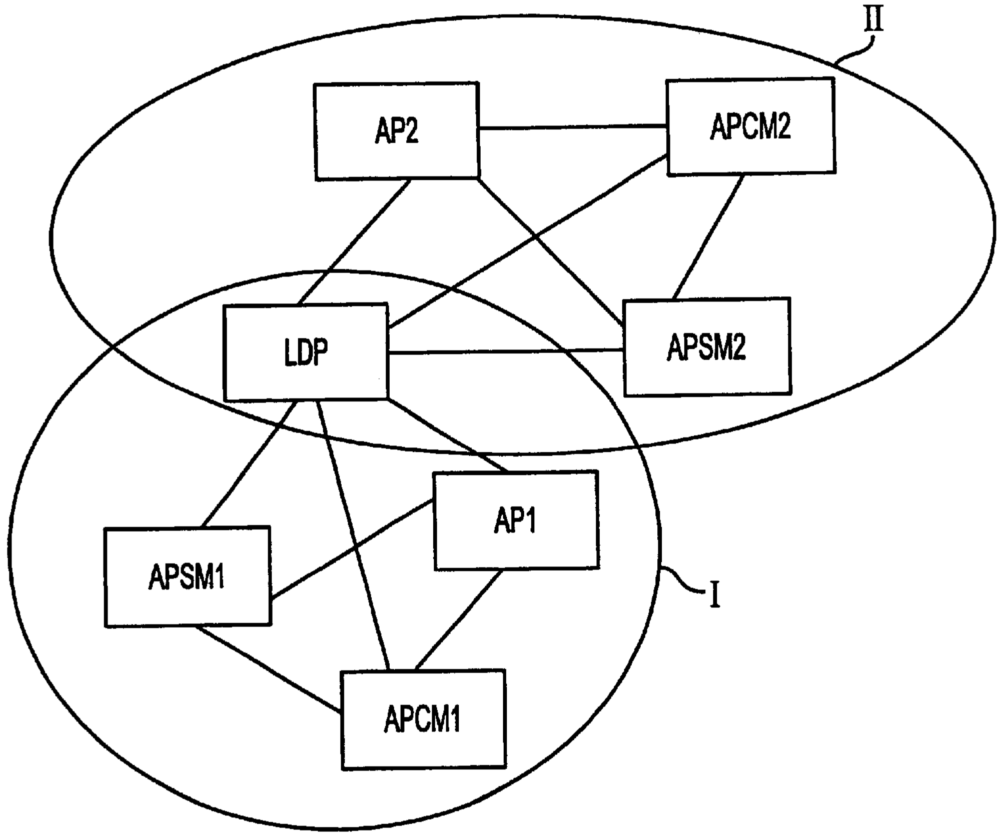
FIG. 38 is an explanatory view of a system structure.

FIG. 38 is an explanatory view of the system structure. As shown in the drawing, for example, one license daemon LDP can establish two groups, I and II, each having the application program AP, the private application manager APCM, and the private license daemon APSM. According to this structure, it is possible to reduce the load of the license daemon LDP. As a result, it is possible to eliminate the delay of the processing time in the software.

Next, the following explanations are given for the concrete decision method for the number of keys according to the present invention.

Figure 39:
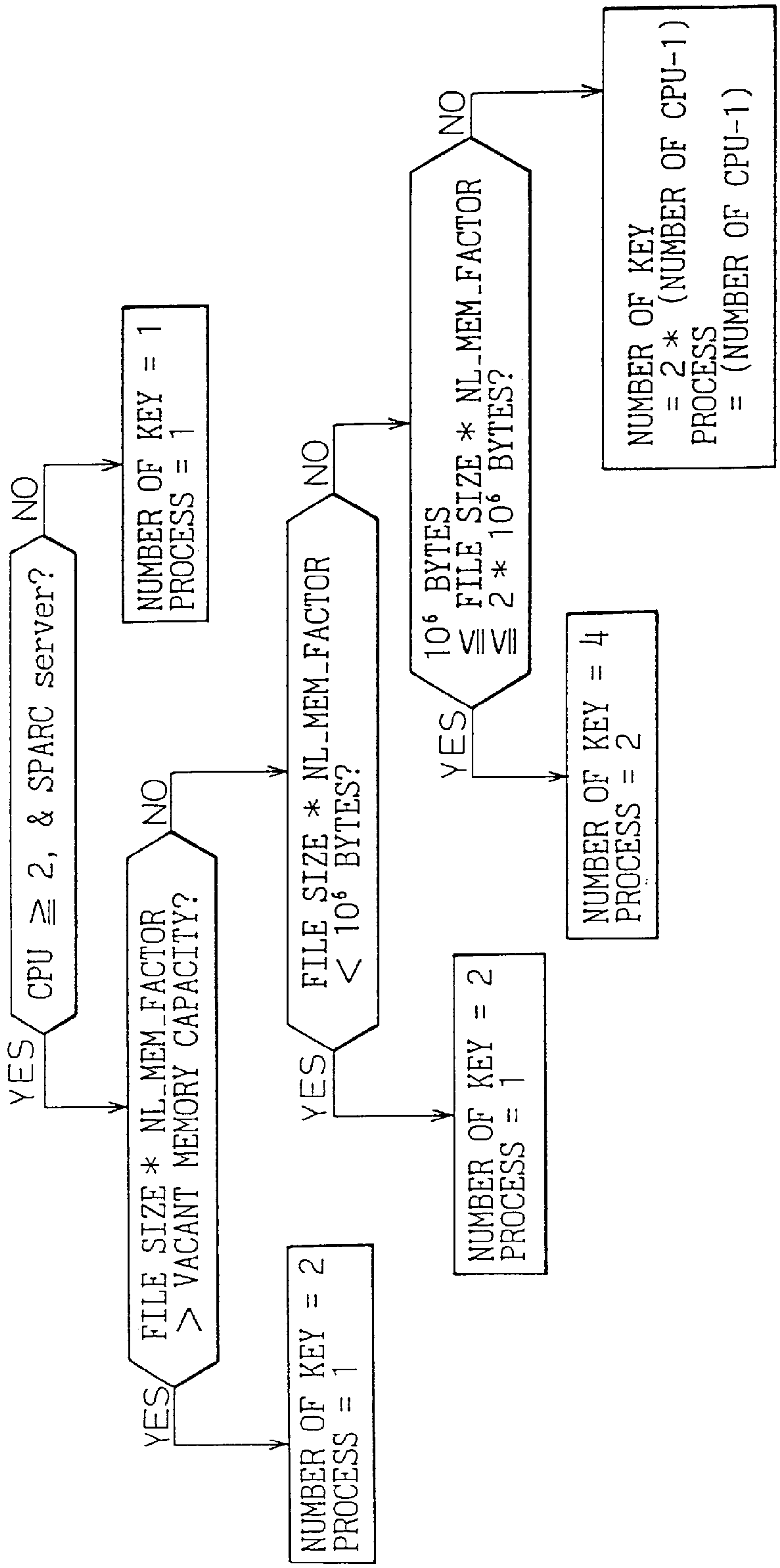
FIG. 39 is a flowchart for determining the number of license (the number of key)

FIG. 39 is a flowchart for determining the number of licenses (number of keys). Further, FIGS. 40(A) to 40(I) are actual function lists for determining the number of key, FIGS. 41(A) to 41(F) are explanatory views of the sample program, and FIGS. 42(A) to 42(C) are explanatory views of the execution result of the sample program.

The actual program using the functions shown in FIGS. 40(A), to 40(I) is provided for processing a predetermined file. In this program, the following items, for example, file size to be processed, platform, number of CPU, capacity of memory, etc., are considered. Based on above consideration, this program has been designed so as to automatically start a plurality of processes in parallel so that it is possible to realize high speed processing of the program. Accordingly, it is necessary to increase/decrease the number of keys in accordance with the number of processes to be started in parallel.

The actual function for determining the number of key is explained in detail below.

In FIGS. 40(A) to 40(I), a first function "GetSystemParameters" gets five parameters, such as, number of CPUs (Ncpu), page size of memory (Psize), number of page for all physical memory capacity (PhyPage), number of pages of vacant memory capacity (AvPage), and platform (Platform). These parameters are delivered to a second function "DetermineNumberOfLicense".

The second function "DetermineNumberOfLicenses" receives a size of the file and five parameters from the first function "GetSystemParmaters", and determines the number of parallel processing. At the same time, the second function "DetermineNumberOfLicenses" determines the necessary number of keys and returns the number of keys as "return value".

At first, the first function "GetSystemParameters" is explained in detail regarding a first block (lines 53 to 68) and a second block (lines 71 to 89) in FIG. 40(D).

Regarding the first block (lines 53 to 68), the first function "GetSystemParameters" gets the following parameters, i.e., number of CPUs(sysconf(_SC_NPPROCESSORS ONLN)), page size of memory (sysconf(_SC_ PAGESIZE)), number of pages of all physical memory capacity (sysconf( SC_PHYS_PAGES)), and number of pages of vacant memory capacity (sysconf (_SC_ AVPHYS_PAGES)). If there is an error in any one of parameters, the process is interrupted.

Regarding the second block (lines 71 to 89), the first function "GetSystemParameters" gets the platform (PLATFORM). If there is an error in the platform, the process is interrupted. When the first function "GetSystemParameters" gets normally all parameters, each value of the following parameters, i.e., number of CPUs (Ncpu), page size of memory (Psize), number of page for all physical memory capacity (PhyPage), and number of pages for vacant memory capacity (AvPage), are substituted for predetermined variables.

Second, the second function "DetermineNumberOfLicenses" is explained in detail with reference to FIG. 39 and FIGS. 40(F) to 40(I).

Regarding the first block (lines 125 to 134), whether a given argument is normal or not is checked. If the argument is abnormal, the process is interrupted. If the argument is normal, the number of licenses (number of key) is set to "default number" (NL=NL_DEFAULT) (see (1) on line 126).

Regarding the second block (lines 138 to 147), either if the number of CPUs within the hardware is one, or if it is not a SPARC server, it is determined that the parallel processing cannot be executed. In this case, it is determined that the number of processes is one and the number of licenses is the default number. Then, the process is terminated in the range of this function. If it is the SPARC server having two or more CPUs, the number of licenses (keys) is set to double that of of default number (NL=NL_DEFAULT+NL_DEFAULT) (see (2) on line 139).

Regarding the third block (lines 150 to 157), a given file size is changed to the number of memory page (see (3) on line 150).

Regarding the fourth block (lines 160 to 181), whether the parallel processing (specified program) should be performed is determined, and the number of parallel processes and the number of key are determined.

Regarding lines 163 to 166, if the value (file size * NL_MEM_FACTOR) is larger than the vacant memory capacity, it is meaningless to perform the parallel processing (According to an experiment, it is obvious that the high speed processing cannot be obtained.). Accordingly, a single process is performed, and the number of key is determined to the default number (i.e., NL =2).

Regarding lines 167 to 181, if the value (file size * NL_MEM_FACTOR) is smaller than the vacant memory capacity, the process is divided into the following three cases.

1) Regarding lines 167 to 171, if the value (file size * NL_MEM_FACTOR) is smaller than $10^6$ bytes, it is meaningless to perform the parallel processing (As mentioned above, as a result of an experiment, it is obvious that the high speed processing cannot be obtained.). Accordingly, a single process is performed, and the number of key is determined to (default number * number of process)

2) Regarding lines 172 to 176, if the value (file size * NL_MEM_FACTOR) is larger than $10^6$ bytes, but less than 2 * $10^6$ bytes, two parallel processes are performed, and the number of key is determined by the value (default number * number of process).

3) Regarding lines 177 to 181, if the value (file size * NL_MEM_FACTOR) is larger than 2 * $10^6$ bytes, the number of parallel processing is performed based on the value (number of CPU−1), the number of key is determined by the value (default number * number of process).

Next, the explanation is given of one sample of the program shown in FIGS. 41(A) to 41(F). This sample program utilizes the function "GetSystemParameters" and gets the information of the hardware, i.e., platform, number of CPU, page size of memory, number of page for all physical memory capacity, and number of page of vacant memory capacity. Result of the above is displayed on a screen. Furthermore, by using the function "DetermineNumberOfLicense", the number of process and the number of license (number of key) for twelve kinds of file sizes are displayed on the screen.

The sample program shown in FIGS. 41(A) to 41(F) is explained in detail below.

Regarding the first block (lines 54 to 62), first, variables are initialized (reset). That is, the number "0" is substituted for the information of the hardware, i.e., number of CPU (Ncpu), page size memory(Psize), number of page for all physical memory capacity(PhyPage), and number of page of vacant memory capacity(AvPage). Further, "NULL" is substituted for the platform (PLATFORM).

Regarding the second block (lines 65 to 81), actual numbers of the hardware, i.e., number of CPU(Ncpu), page size of memory(Psize), number of page for all physical memory capacity(PhyPage), and number of page of vacant memory capacity(AvPage), are determined and displayed on the screen.

Regarding the third block (lines 85 to 103), regarding twelve kinds of file sizes, the number of parallel processing (number of process) and the number of license (number of key) are determined based on the information of the hardware given by the above processes. The determined number of process and number of license are displayed on the screen.

The result of execution of the sample program is explained in detail with reference to FIGS. 42(A) to 42(C). The sample program was executed by using two kinds of workstations (model S-4/1 and model S-4/1000) each using Solaris 2.5.

In FIG. 42(A), the sample program was executed by the model S-4/1 as the platform. In this case, since the number of CPU is only one, the number of license (number of key) is always one regardless file size.

In FIG. 42(B), the sample program was executed by the model S-4/1000 as the platform. In this case, the SPARC server having four CPUs was used for this model, and the number of parallel processing and the number of license (number of key) are different each other in accordance with the file size.

In FIG. 42(C), the sample program was also executed by the model S-4/1000 as the platform. In this case, the SPARC server having four CPUs was also used for this model. Since the number of pages of the vacant memory capacity (AvPage) is small, the parallel processing was not performed. Accordingly, all number of license (number of key) are two.

As is obvious from above explanations, basically, the number of key decision function is created so as to satisfy the following items.

First, the performance of the CPU has been checked previously. When the CPU has high performance, it is necessary to provide many number of keys.

Second, the vacant memory capacity and the file size are compared each other. When the parallel processing should be performed, it is necessary to provide many number of keys.

Third, if there is another parameter to be considered, it is possible to change the number of license (number of key) by making functions similar to the above.

Capability of Utilization in Industry

As explained above, according to the present invention, it is possible to solve various problems existing in both software maker and the user in the conventional license system. Accordingly, the software maker has always searched and developed an optimum license management in order to supply the software, which have been developed at large expense, to the user based on a suitable price. As a result, the license management system according to the present invention can provide an issuance of license in which the sales strategy was sufficiently considered so that the present invention includes very high possibility for utilization in an industry.

What is claimed is:

1. A license management system for software which drives a single computer or a plurality of computers, comprising:

an application program requesting a decision of a number of licenses required to drive itself and receiving issuance of the licenses;

a number of licenses decision unit determining the necessary number of licenses in accordance with the request from the application program based on the following multi-nominal function:

$$LK=f(x\mathbf{1}, x\mathbf{2}, \ldots, xn)$$

wherein, LK is the number of licenses, and x1 to xn are parameters for the LK, which are required to determine the number of licenses, and which are set in accordance with hardware resources used by a user; and a licenses management unit issuing the number of licenses determined by the number of licenses decision unit, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

2. A licenses management system as claimed in claim 1, wherein the number of licenses decision unit further comprises a unit acquiring necessary parameters to determine the number of licenses, when the application program starts.

3. A licenses management system as claimed in claim 1, wherein the licenses management unit further comprises a unit subtracting the necessary number of licenses from the number of licenses, held in the licenses management unit, when the number of licenses is correct, and issuing the licenses to the application program when the number of licenses held therein is not negative.

4. A licenses management system as claimed in claim 1, wherein the number of licenses decision unit is a daemon program.

5. A licenses management system as claimed in claim 1, further comprising a database determining a multi-nominal function, wherein the multi-nominal function is changed in the database without changing the multi-nominal function in the number of licenses decision unit.

6. A licenses management system for software which drives a single computer or a plurality of computers, comprising:

an application program requesting a decision of the number of licenses required to drive itself and receiving issuance of the licenses;

a number of licenses decision unit included in the application program, determining the necessary number of licenses in accordance with the request from the application program, based on the following multi-nominal function:

$$LK=f(x1,x2\ldots,xn)$$

wherein, LK is the number of licenses, and x1 to xn are parameters for the LK, which are required to determine the number of licenses, and which are set in accordance with hardware resources used by a user; and a licenses management unit issuing the number of licenses determined by the number of licenses decision function, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

7. A licenses management system as claimed in claim 6, wherein the number of licenses decision function is a function call.

8. A licenses management system as claimed in claim 6, wherein the number of licenses decision function comprises a unit acquiring values of necessary parameters to determine the number of required licenses when the application program starts.

9. A licenses management system as claimed in claim 6, wherein the licenses management unit subtracts the necessary number of licenses from the number of licenses, which are held in the licenses management unit, when the number of licenses is correct and issues the required licenses to the application program when the number of licenses, held therein, is not negative.

10. A licenses management system as claimed in claim 6, further comprising a database determining a multi-nominal function, wherein the multi-nominal function is changed in the database without changing the multi-nominal function in the number of licenses decision unit.

11. A licenses and software managing method in a license management system comprising a license management unit, an application program and a number of licenses decision unit, the software managing method driving a single computer or a plurality of computers and comprising:

delivering parameters from the application program to the number of licenses decision unit which calculates a multi-nominal function in order to determine the number of licenses required to start the application program when the application program is invoked;

determining a number of licenses by checking values of parameters required to determine the number of licenses based on the following multi-nominal function:

$$LK=f(x1, x2, \ldots, xn)$$

wherein LK is the number of licenses, and x1 to xn are parameters for the LK, which are required to determine the number of licenses, and which are set in accordance with hardware resources used by a user, substituting the determined number of licenses for the parameters delivered from the application program, and returning the parameters to the application program;

notifying the necessary number of licenses, from the application program to the licenses management unit, by delivering the parameters for the LK and requesting the licenses; and subtracting the necessary number of licenses from the number of licenses, held in the licenses management unit, when the licenses management unit receives a normal flag from the number of licenses decision unit and returning the normal flag to the application program when the number of licenses, held in the licenses management unit, is not negative and issuing the licenses to the application program, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

12. A method for managing licenses in a licenses management system as claimed in claim 11, wherein the licenses management further comprises:

notifying the number of licenses notified from the application program to the number of licenses decision unit in order to confirm whether the number of licenses requested by the application program is correct; and comparing the number of licenses notified from the application program to the licenses management unit with the necessary number of licenses notified to the application program, and of returning the normal flag to the licenses management unit when a result of comparison is correct.

13. A method for managing licenses in a licenses management system as claimed in claim 11, further comprising terminating the application program at a time when an abnormal flag is returned from the licenses management unit.

14. A method for managing licenses in a licenses management system as claimed in claim 11, wherein the number of licenses decision unit is a daemon program.

15. A licenses and software managing method in a licenses management system comprising an application program, a licenses management unit, and a number of licenses decision function provided in the application program, the software managing method driving a single computer or a plurality of computers and comprising:

delivering parameters from the application program to the number of licenses decision unit in order to determine the number of licenses required to start the application program;

determining a number of licenses by checking values of parameters required to determine the number of licenses based on the following multi-nominal function:

$$LK=f(x1, x2, \ldots, xn)$$

wherein, LK is the number of licenses, and x1 to xn are parameters for the LK, which are required to determine the number of licenses, and which are set in accordance with hardware resources used by a user, substituting the determined number of licenses for the parameters for the LK delivered from the application program, and returning the determined number of licenses to the application program;

notifying the necessary number of licenses from the application program to the licenses management unit by delivering the parameters, and requesting the licenses; and subtracting the necessary number of licenses from the number of licenses, held in the licenses management unit, when the licenses management unit receives a request from the application program, and returning a normal flag to the application program when the number of licenses, held in the licenses management unit, is not negative and issuing the licenses to the application program, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

16. A method for managing licenses in a licenses management system as claimed in claim 15, further comprising terminating the application program at a time when an abnormal flag is returned from the licenses management unit.

17. A method for managing licenses in a licenses management system as claimed in claim 15, wherein the number of licenses decision function is a function call.

18. A licenses and software managing method in a license management system comprising a license management unit, an application program, a number of licenses decision unit, and an external database, the software managing method driving a single computer or a plurality of computers and comprising:

delivering parameters from the application program to the number of licenses decision unit in order to determine the number of licenses required to start the application program, when the application program is invoked;

reading data from the database and supplying the read data to the number of licenses decision unit, determining a multi-nominal function and the number of licenses by checking values of parameters required to determine the number of licenses based on the following multi-nominal function:

$$LK=f(x\mathbf{1}, x\mathbf{2}, \ldots, xn)$$

wherein, LK is the number of licenses, and x1 to xn are parameters for the LK, which are required to determine the number of licenses, and which are set in accordance with hardware resources used by a user, substituting the determined number of licenses for the parameters for the LK delivered from the application program, and returning the determined number of licenses to the application program, in the number of licenses decision unit;

notifying the necessary number of licenses, from the application program to the licenses management unit, by delivering the parameters for the LK and requesting the licenses; and subtracting the necessary number of licenses from the number of licenses, held in the licenses management unit, when the licenses management unit receives a normal flag from the number of licenses decision unit, and returning the normal flag to the application program when the number of licenses, held in the licenses management unit, is not negative and issuing the licenses to the application program, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

19. A method for managing licenses in a licenses management system as claimed in claim 18, further comprising:

notifying the number of licenses, notified from the application program, to the number of licenses decision unit in order to confirm whether the number of licenses requested by the application program is correct; and comparing the number of licenses, notified from the application program to the licenses management unit, with the necessary number of licenses, notified to the application program; and returning the normal flag to the licenses management unit when a result of comparison is correct.

20. A method for managing licenses in a licenses management system as claimed in claim 18, further comprising terminating the application program at a time when an abnormal flag is returned from the licenses management unit.

21. A method for managing licenses in a licenses management system as claimed in claim 18, wherein the number of licenses decision unit is a daemon program.

22. A method for managing licenses in a licenses management system as claimed in claim 18, wherein the database is changed when the multi-nominal function is changed without changing the number of licenses decision unit.

23. A licensing and software managing method in a licenses management system comprising an application program, a license management unit, a number of licenses decision function provided in the application program and an external database, the software managing method driving a single computer or a plurality of computers and comprising:

delivering parameters from the application program to the number of licenses decision unit which calculates a multi-nominal function in order to determine the number of licenses required to start the application program when the application program is invoked;

reading data from the database and supplying the read data to the number of licenses decision unit, determining a multi-nominal function and the number of licenses by checking values of necessary parameters required to determine the number of licenses based on the following multi-nominal function:

$$LK=f(x\mathbf{1}, x\mathbf{2}, \ldots, xn)$$

wherein, LK is the number of licenses, and x1 to xn are parameters for the LK, which are required to determine the number of licenses, and which are set in accordance with hardware resources used by a user, substituting the determined number of licenses for the parameters for the LK delivered from the application program, and returning the determined number of licenses to the application program, in the number of licenses decision unit;

notifying the necessary number of licenses from the application program to the licenses management unit by delivering the parameters for the LK, and requesting the licenses; and subtracting the necessary number of licenses from the number of licenses held in the license management unit, when the license management unit receives a request from the application program, returning a normal flag to the application program when the number of licenses, held in the license management unit, is not negative and issuing the licenses to the application program, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

24. A method for managing licenses in a licenses management system as claimed in claim 23, further comprising terminating the application program at a time when an abnormal flag is returned from the license management unit.

25. A method for managing licenses in a licenses management system as claimed in claim 23, wherein the number of licenses decision function is a function call.

26. A licenses management system as claimed in claim 1, further comprising a private licenses daemon, separately provided from the license daemon of the licenses management unit and a private application manager, separately provided from the application program, wherein communication is performed between the private license daemon and the private application manager.

27. A licenses management system as claimed in claim 26, wherein plural sets of the private license daemon and the private application manager are established for one license daemon.

28. A method of communicating information between a private license daemon and a private application manager in a licenses management system for software comprising an application program requesting a decision of a number of licenses required to drive itself and receiving issuance of the licenses, a number of licenses decision unit determining the necessary number of licenses in accordance with the request from the application program based on a multi-nominal function (LK) operating with parameters to produce the necessary number of licenses, which are set in accordance with hardware resources used by a user and a license managing unit issuing the number of licenses determined by the number of licenses decision unit, the private license daemon being separately provided from a license daemon of a license management unit, and the private application manager being separately provided from an application program, the method comprising:

sending a request from the application program to the license daemon in order to acquire an approval of execution of the license when a user starts the application program;

generating a fork instruction in order to establish the private license daemon; and sending an approval of execution from the private license daemon to the application program in order to issue the license, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

29. A method of communicating information as claimed in claim 28, frther comprising:

terminating the application program when the approval of execution is not obtained from the private license daemon.

30. A method of communicating information as claimed in claim 28, further comprising:

notifying an invalidation from the application program to the user when the approval of execution is obtained from the private license daemon, but it includes an invalid content.

31. A method of communicating information as claimed in claim 28, further comprising:

generating the fork instruction in order to establish the private application manager when the approval of execution is obtained from the private license daemon, and it includes a valid content; and starting communication between the private license daemon and the private application manager.

32. A method of communicating information as claimed in claim 28, further comprising:

sending a request of termination from the application program to the private application manager when the user terminates the application program.

33. A method of communicating information as claimed in claim 28, further comprising:

setting an invalid information into a pipe from the private application manager; and reading the invalid information of the pipe from the application program when the application program does not terminate after sending a request for the termination accidentally.

34. A method of communicating information as claimed in claim 28, further comprising:

sending a termination report indicating termination of the application program from the private application manager to the license daemon, when the application program is terminated.

35. A method of communicating information as claimed in claim 28, further comprising:

writing information from the license daemon to an external database when the application program is terminated; and generating a termination instruction from the license daemon to the private license daemon.

36. A method of communicating information as claimed in claim 28, further comprising:

periodically polling between the private license daemon and the private application manager in order to check whether a normal communication is performed therebetween.

37. A method of communicating information as claimed in claim 36, further comprising:

sending a check request from the private license daemon to the private application manager in order to check whether the private application manager is operating normally.

38. A method of communicating information as claimed in claim 36, further comprising:

sending a normal notification from the private application manager to the private license daemon when a check of contents from the private license daemon and check of contents in the private application manager itself are successful.

39. A method of communicating information as claimed in claim 36, further comprising:

sending a termination instruction from the private license daemon to the license daemon when the private license daemon receives an abnormal response from the private application manager; and terminating the private licenses daemon itself.

40. A method of communicating information as claimed in claim 36, further comprising:

performing an invalidation process, from the license daemon to the application program, in order to release the license which was assigned from the license daemon to the application program.

41. A method of communicating information as claimed in claim 36, further comprising:

sending a check request, from the private application manager to the private license daemon, in order to check whether the private license daemon operating normally.

42. A method of communicating information as claimed in claim 41, further comprising:

sending a normal notification, from the private license daemon to the private application manager, when a check of contents from the private application manager and a check of contents in the private, license daemon itself are successful.

43. A method of communicating information as claimed in claim 41, further comprising:

setting an invalid information into a pipe from the private application manager when a check of contents in the private application manager itself and a check of contents in the private license daemon are unsuccessful; and terminating the application program itself by reading the invalid information from the pipe.

44. A method of communicating information as claimed in claim 28, further comprising:

sending a request of restart, from the private application manager to the license daemon, in order to restart the private license daemon, when the private application manager detects an abnormal termination of the private license daemon.

45. A method of communicating information as claimed in claim 44, further comprising: sending a notification, indicating that the private license daemon is not restarted, to the private application manager when the license daemon detects that the private license daemon invalidates the request of restart.

46. A method of communicating information as claimed in claim 44, further comprising:

providing a private license daemon based on a new fork from the license daemon when the license daemon detects that the private license daemon validates the request of restart and updating a database from the new private license daemon; and sending a notification indicating that the new private license daemon is restarted, from the new private license daemon to the private application manager.

47. A method of communicating information as claimed in claim 28, further comprising:

periodically polling from the private license daemon to the license daemon.

48. A method of communicating information between a private license daemon and a private application manager in a license management system for software comprising an application program requesting a decision of a number of licenses required to drive itself and receiving issuance of the licenses, a number of licenses decision function included in the application program determining the necessary number of licenses in accordance with the request from the application program based on a multi-nominal function (LK) operating with parameters to produce the necessary number of licenses, and a license managing unit issuing the number of licenses determined by the number of licenses decision function which are set in accordance with hardware resources used by a user, the private license daemon being separately provided from a license daemon of a license management unit, and the private application manager being separately provided from an application program, the method comprising:

sending a request from the application program to the license daemon in order to acquire an approval of execution of the license when a user starts the application program;

generating a fork instruction in order to establish the private license daemon; and sending an approval of execution from the private license daemon to the application program in order to issue the license, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

49. A method of communicating information as claimed in claim 48, further comprising:

terminating the application program when the approval of execution is not obtained from the private license daemon.

50. A method of communicating information as claimed in claim 48, further comprising:

notifying an invalidation from the application program to the user when the approval of execution is obtained from the private license daemon, but it includes an invalid content.

51. A method of communicating information as claimed in claim 48, further comprising:

generating the fork instruction in order to establish the private application manager when the approval of execution is obtained from the private license daemon, and it includes a valid content; and starting communication between the private license daemon and the private application manager.

52. A method of communicating information as claimed in claim 48, further comprising:

sending a request of termination from the application program to the private application manager when the user terminates the application program.

53. A method of communicating information as claimed in claim 48, further comprising:

setting an invalid information into a pipe from the private application manager; and reading the invalid information of the pipe from the application program when the application program does not terminate after sending a request for the termination accidentally.

54. A method of communicating information as claimed in claim 48, further comprising:

sending a termination report indicating termination of the application program from the private application manager to the license daemon, when the application program is terminated.

55. A method of communicating information as claimed in claim 48, further comprising:

writing information from the license daemon to an external database when the application program is terminated; and generating a termination instruction from the license daemon to the private license daemon.

56. A method of communicating information as claimed in claim 48, further comprising:

periodically polling between the private license daemon and the private application manager in order to check whether a normal communication is performed therebetween.

57. A method of communicating information as claimed in claim 56, further comprising:

sending a check request from the private license daemon to the private application manager in order to check whether the private application manager is operating normally.

58. A method of communicating information as claimed in claim 56, further comprising:

sending a normal notification from the private application manager to the private license daemon when a check of contents from the private license daemon and check of contents in the private application manager itself are successful.

59. A method of communicating information as claimed in claim 56, further comprising:

sending a termination instruction from the private license daemon to the license daemon when the private license daemon receives an abnormal response from the private application manager; and terminating the private licenses daemon itself.

60. A method of communicating information as claimed in claim 56, further comprising:

performing an invalidation process, from the license daemon to the application program, in order to release the license which was assigned from the license daemon to the application program.

61. A method of communicating information as claimed in claim 56, further comprising:

sending a check request, from the private application manager to the private license daemon in order to check whether the private license daemon operating normally.

62. A method of communicating information as claimed in claim 61, further comprising:

sending a normal notification, from the private license daemon to the private application manager, when a check of contents from the private application manager and a check of contents in the private, license daemon itself are successful.

63. A method of communicating information as claimed in claim 61, further comprising:

setting an invalid information into a pipe from the private application manager when a check of contents in the private application manager itself and a check of contents in the private license daemon are unsuccessful; and terminating the application program itself by reading the invalid information from the pipe.

64. A method of communicating information as claimed in claim 48, further comprising:

sending a request of restart, from the private application manager to the license daemon, in order to restart the private license daemon, when the private application manager detects an abnormal termination of the private license daemon.

65. A method of communicating information as claimed in claim 64, further comprising:

sending a notification, indicating that the private license daemon is not restarted, to the private application manager when the license daemon detects that the private license daemon invalidates the request of restart.

66. A method of communicating information as claimed in claim 64, further comprising:

providing a private license daemon based on a new fork from the license daemon when the license daemon detects that the private license daemon validates the request of restart and updating a database from the new private license daemon; and sending a notification indicating that the new private license daemon is restarted, from the new private license daemon to the private application manager.

67. A method of communicating information as claimed in claim 48, further comprising:

periodically polling from the private license daemon to the license daemon.

68. A license management system, comprising:

a number of license decision units to determine a necessary number of licenses in response to a request from an application program based on the multi-nominal function LK=f(x1, x2, . . . , xn) wherein LK is the necessary number of licenses and x1 to xn are parameters for the LK, which are required to determine the number of licenses, and which are set in accordance with hardware resources used by a user, the application program being constituted so as to be able to start a plurality of processes in parallel, the parameters for the LK being, on the hardware resources, the number of CPUs, the capacity of memory, the capacity of vacant memory, the type of platform, and the size of a data file to be processed, and thereby determining the number of parallel processes that are able to be started in parallel by the application program on the hardware resources and finding the number of licenses based on the number of the parallel processes.

* * * * *

UNITED STATES PATENT AND TRADEMARK OFFICE

CERTIFICATE OF CORRECTION

PATENT NO. : 7,013,294 B1 
APPLICATION NO. : 09/202189
DATED : March 14, 2006
INVENTOR(S) : Kazunari Sekigawa et al.

It is certified that error appears in the above-identified patent and that said Letters Patent is hereby corrected as shown below:

Cover Page, line (75) Inventors, change “Tomomi Sata, Nagano (JP)” to --Tomomi Osaki, Shizuoka (JP)--

In the Figures:

Fig. 6, change “KEY” to --KEYS--.
Fig. 7, change “KEY” to --KEYS--.
Fig. 8, change “KEY” to --KEYS--.
Fig. 9, change “KEY” to --KEYS--.
Fig. 39, change “KEY” to --KEYS-- (5 occurrences).
Fig. 40(B), line 36, after “Number” insert --of--.
Fig. 40(E), line 103, after “Number” insert --of--, line 110, change “license” to --licenses--.
Fig. 40(F), lines 113, 116, and 127, change “license” to --licenses--.
Fig. 40(H), lines 169 and 174, change “license” to --licenses--.
Fig. 40(I), line 179, change “license” to --licenses--.
Fig. 41(A), line 4, change “license” to --licenses--.
Fig. 41(B), line 24, change “license” to --licenses--.
Fig. 41(E), lines 90, 94 and 99, change “license” to --licenses--.
Fig. 41(E), line 99, change “Process” to --Processes--.
Fig. 42(A), change “Process” to --Processes-- and “License” to --Licenses-- (12 occurrences).
Fig. 42(B), change “Process” to --Processes-- and “License” to --Licenses-- (12 occurrences).

Signed and Sealed this

Twenty-seventh Day of March, 2007

JON W. DUDAS
*Director of the United States Patent and Trademark Office*